US012576811B2

(12) United States Patent  
Asai et al.

(10) Patent No.: US 12,576,811 B2  
(45) Date of Patent: Mar. 17, 2026

(54) INFORMATION PROCESSING DEVICE, INFORMATION PROCESSING DEVICE-EQUIPPED VEHICLE, INFORMATION PROCESSING METHOD, AND RECORDING MEDIUM RECORDED WITH PROGRAM

(71) Applicant: TOYOTA JIDOSHA KABUSHIKI KAISHA, Toyota (JP)

(72) Inventors: Shimpei Asai, Okazaki (JP); Jumpei Fuke, Toyota (JP); Kuniharu Tsuzuki, Handa (JP); Shota Honda, Miyoshi (JP); Toru Yoshihara, Miyoshi (JP); Naoyuki Takada, Toyota (JP); Nobuyoshi Nagai, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 337 days.

(21) Appl. No.: 17/859,187

(22) Filed: Jul. 7, 2022

(65) Prior Publication Data

US 2023/0061183 A1 Mar. 2, 2023

(30) Foreign Application Priority Data

Aug. 31, 2021 (JP) ................................. 2021-140998

(51) Int. Cl.  
*B60R 25/24* (2013.01)  
*B60R 25/20* (2013.01)  
*H04B 5/70* (2024.01)

(52) U.S. Cl.  
CPC .......... *B60R 25/241* (2013.01); *B60R 25/209* (2013.01); *B60R 2325/205* (2013.01); *H04B 5/70* (2024.01)

(58) Field of Classification Search  
None  
See application file for complete search history.

(56) References Cited

U.S. PATENT DOCUMENTS

| | | | | |
|---|---|---|---|---|
| 8,943,187 | B1 * | 1/2015 | Saylor ................ | G07C 9/00857 |
| | | | | 709/225 |
| 10,235,820 | B2 * | 3/2019 | Bartels ................ | H04W 12/065 |
| 10,538,220 | B1 * | 1/2020 | Tyagi .................... | B60R 25/245 |
| 10,589,719 | B1 * | 3/2020 | Sohn ..................... | B60R 25/241 |
| 10,793,108 | B2 * | 10/2020 | Gersabeck ............ | B60R 25/209 |

(Continued)

FOREIGN PATENT DOCUMENTS

| | | |
|---|---|---|
| CN | 106056702 A | 10/2016 |
| EP | 3 392 433 A1 | 10/2018 |

(Continued)

*Primary Examiner* — Anil K Bhargava  
(74) *Attorney, Agent, or Firm* — OLIFF PLC

(57) ABSTRACT

An information processing device including a reception section 130 configured to receive user operation for disabling a vehicle control function by a first key configured to be used to control a vehicle, a confirmation section 132 configured to check whether a prescribed communication can be performed with a second key that is a key configured to be used to control the vehicle and that is different from the first key, and a processing section 134 configured to perform processing to suppress disabling of the vehicle control function by the first key according to the user operation in cases in which the prescribed communication with the second key has not been confirmed by the confirmation section.

11 Claims, 19 Drawing Sheets

(56) References Cited

U.S. PATENT DOCUMENTS

| | | | | |
|---|---|---|---|---|
| 11,068,893 | B2* | 7/2021 | Hassani | H04L 63/0853 |
| 11,077,828 | B2* | 8/2021 | Park | B60R 25/102 |
| 11,080,386 | B2* | 8/2021 | Woo | G06F 1/3287 |
| 11,643,050 | B2* | 5/2023 | Brückner | H04W 4/023 |
| | | | | 340/5.61 |
| 11,820,325 | B2* | 11/2023 | Fuke | G07C 9/00309 |
| 2003/0103075 | A1* | 6/2003 | Rosselot | H04L 41/22 |
| | | | | 348/E7.083 |
| 2008/0150683 | A1* | 6/2008 | Mikan | G07C 9/00309 |
| | | | | 340/5.31 |
| 2009/0172583 | A1* | 7/2009 | Want | G06F 3/0481 |
| | | | | 715/810 |
| 2010/0090817 | A1* | 4/2010 | Yamaguchi | G07C 9/00309 |
| | | | | 340/426.35 |
| 2010/0231349 | A1* | 9/2010 | Tanaka | B60R 25/24 |
| | | | | 340/426.22 |
| 2014/0282877 | A1* | 9/2014 | Mahaffey | H04W 12/33 |
| | | | | 726/3 |
| 2016/0019738 | A1* | 1/2016 | Kim | G07C 9/00182 |
| | | | | 340/5.22 |
| 2016/0112493 | A1* | 4/2016 | Yasuhara | H04L 63/10 |
| | | | | 709/219 |
| 2016/0217635 | A1* | 7/2016 | Pudar | G07C 9/00571 |
| 2016/0295005 | A1* | 10/2016 | Schussmann | H04L 67/306 |
| 2016/0300417 | A1* | 10/2016 | Hatton | G07C 9/00857 |
| 2016/0358396 | A1* | 12/2016 | Spiess | H04B 5/70 |
| 2016/0381199 | A1* | 12/2016 | Pelly | G01C 21/362 |
| | | | | 455/557 |
| 2017/0104589 | A1* | 4/2017 | Lambert | H04L 9/3268 |
| 2017/0118178 | A1* | 4/2017 | Fruehling | H04M 1/026 |
| 2017/0178035 | A1* | 6/2017 | Grimm | H04L 67/12 |
| 2018/0096546 | A1* | 4/2018 | Bartels | G07C 9/29 |
| 2018/0304903 | A1* | 10/2018 | Sinaguinan | B60W 50/0098 |
| 2018/0357846 | A1* | 12/2018 | Chen | B60R 25/241 |
| 2018/0361991 | A1* | 12/2018 | Mitsubayashi | B60R 25/245 |
| 2019/0066412 | A1* | 2/2019 | Nam | H04L 63/107 |
| 2019/0109855 | A1* | 4/2019 | Takeuchi | H04L 9/3271 |
| 2019/0130681 | A1* | 5/2019 | Chin | G07C 9/00309 |
| 2019/0184939 | A1* | 6/2019 | Hioki | G06Q 50/40 |
| 2019/0279448 | A1* | 9/2019 | Kwon | H04W 12/04 |
| 2019/0291694 | A1* | 9/2019 | Suda | G07C 9/00571 |
| 2020/0353882 | A1* | 11/2020 | Beiser | G07F 9/001 |
| 2020/0361335 | A1* | 11/2020 | Penilla | B60R 25/01 |
| 2021/0293075 | A1* | 9/2021 | Oesterling | H04W 4/40 |
| 2021/0331646 | A1* | 10/2021 | Schubert | B60R 25/241 |
| 2022/0161756 | A1* | 5/2022 | Pylappan | G07C 9/22 |
| 2022/0231862 | A1* | 7/2022 | Chen | H04W 12/0471 |
| 2023/0061183 | A1* | 3/2023 | Asai | B60R 25/24 |
| 2023/0186699 | A1* | 6/2023 | Fuke | G07C 9/00309 |
| | | | | 340/5.72 |
| 2023/0208625 | A1* | 6/2023 | Wang | H04L 9/085 |
| | | | | 713/171 |
| 2023/0251648 | A1* | 8/2023 | Gutierrez | B60H 1/00657 |
| | | | | 701/2 |

FOREIGN PATENT DOCUMENTS

| | | | | |
|---|---|---|---|---|
| JP | 2009-293283 | A | | 12/2009 |
| JP | 2014-054902 | A | | 3/2014 |
| JP | 2015-052223 | A | | 3/2015 |
| JP | 5881797 | B1 | | 3/2016 |
| JP | 2016-081345 | A | | 5/2016 |
| JP | 3392433 | | * | 10/2018 |
| JP | 2019-105056 | A | | 6/2019 |
| KR | 10-2019-0046354 | A | | 5/2019 |

* cited by examiner

Figure 6:
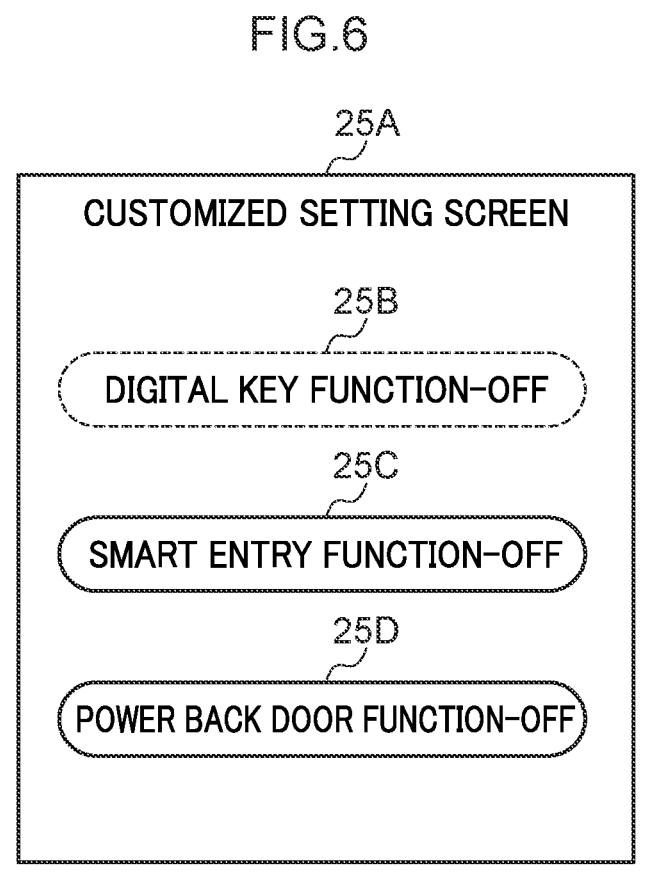

CUSTOMIZED SETTING SCREEN

25B

DIGITAL KEY FUNCTION-OFF

25C

SMART ENTRY FUNCTION-OFF

25D

POWER BACK DOOR FUNCTION-OFF

Figure 15:
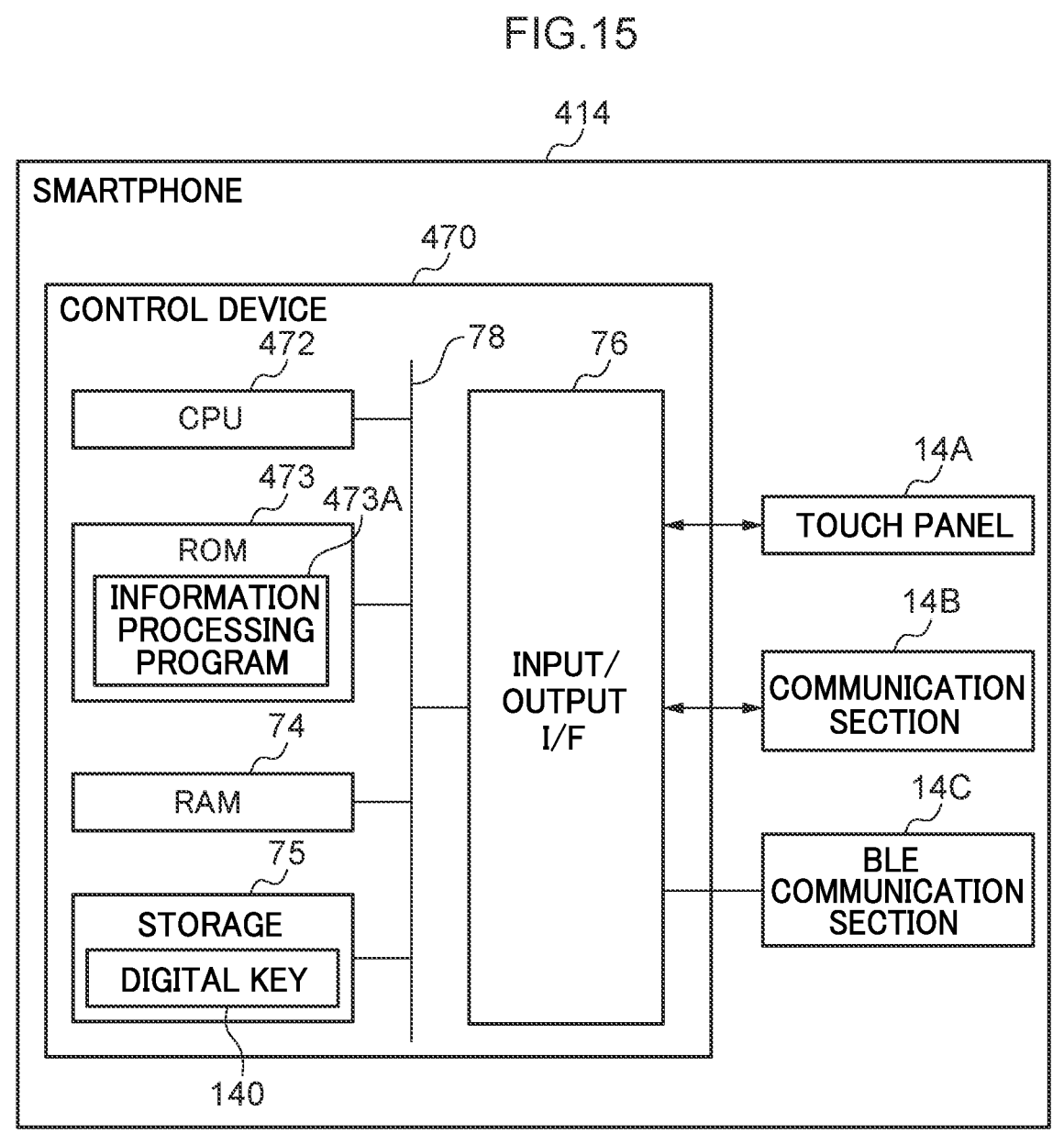

SMARTPHONE

470

CONTROL DEVICE

472

CPU 473  473A

ROM

INFORMATION
PROCESSING
PROGRAM

74

RAM

75

STORAGE

DIGITAL KEY

140

78    76

INPUT/
OUTPUT
I/F

14A

TOUCH PANEL

14B

COMMUNICATION
SECTION

14C

BLE
COMMUNICATION
SECTION

INFORMATION PROCESSING DEVICE, INFORMATION PROCESSING DEVICE-EQUIPPED VEHICLE, INFORMATION PROCESSING METHOD, AND RECORDING MEDIUM RECORDED WITH PROGRAM

CROSS-REFERENCE TO RELATED APPLICATION

This application is based on and claims priority under 35 USC 119 from Japanese Patent Application No. 2021-140998 filed on Aug. 31, 2021, the disclosure of which is incorporated by reference herein.

BACKGROUND

Technical Field

The present disclosure relates to an information processing device, an information processing device-equipped vehicle, an information processing method, and a program.

Related Art

A notification device disclosed in Japanese Patent Application Laid-Open (JP-A) No. 2014-054902 makes a user aware that a portable terminal is being employed as a vehicle key. In the notification device, when a smartphone is being employed as a vehicle key, the fact that the smartphone is being employed as a vehicle key is notified to user, and the fact that the smartphone is being employed as a vehicle key is displayed on a display device together with a picture of a smartphone, and content to suppress taking the smartphone away is displayed.

In recent technology a digital key recorded on a smartphone is employed to perform vehicle control, such as locking or unlocking a vehicle, starting the engine thereof, or the like.

A digital key function for a vehicle might conceivably be disabled by a user operating vehicle settings. In such cases vehicle control, such as locking or unlocking an opening and closing section of the vehicle, starting the engine, or the like would no longer be able to be performed if the user is only in possession of the smartphone, resulting in inconvenience.

SUMMARY

An object of the present disclosure is to suppress the occurrence of inconvenience even when a vehicle control function by a key is disabled.

A first aspect is an information processing device including a reception section, a confirmation section, and a processing section. The reception section is configured to receive user operation for disabling a vehicle control function by a first key configured to be used to control a vehicle. The confirmation section is configured to confirm whether a prescribed communication can be performed with a second key that is a key configured to be used to control the vehicle and that is different from the first key. The processing section is configured to perform processing to suppress disabling of the vehicle control function by the first key according to the user operation in a case in which the prescribed communication with the second key has not been confirmed by the confirmation section.

In the information processing device of the first aspect, the confirmation section confirms whether the prescribed communication can be performed with a second key that is a key configured to be used to control the vehicle and that is different from the first key. The processing section performs processing to suppress disabling of the vehicle control function by the first key according to the user operation in a case in which the prescribed communication with the second key has not been confirmed by the confirmation section. Reference here to "vehicle control function by a key" indicates a function of controlling a vehicle by key operation, such as locking and unlocking of an opening and closing section, switching vehicle power ON, and starting the engine. The information processing device is accordingly able to suppress the occurrence of inconvenience even when a vehicle control function by a key is disabled.

An information processing device of a second aspect is the information processing device of the first aspect, wherein the reception section is configured to receive a press-operation of a button that is provided inside the vehicle and is a button for disabling the vehicle control function by the first key.

The information processing device of the second aspect disables the vehicle control function by the first key by receiving the press-operation of the button provided inside the vehicle. This information processing device is accordingly able to disable a vehicle control function by a key easily.

An information processing device of a third aspect is the information processing device of the first aspect, wherein the reception section is configured to receive the user operation for disabling the vehicle control function by the first key on a user interface displayed at a display section.

The information processing device of the third aspect disables the vehicle control function by the first key by receiving user operation on the user interface displayed on the display section. This information processing device is accordingly able to disable a vehicle control function by a key easily.

An information processing device of a fourth aspect is the information processing device of the third aspect, wherein the processing section is configured to control so as to make the user operation on the user interface non-receivable in a case in which the prescribed communication with the second key has not been confirmed by the confirmation section.

The information processing device of the fourth aspect controls to make the user operation on the user interface non-receivable in a case in which the prescribed communication with the second key has not been confirmed. This information processing device is accordingly able to reliably suppress disabling of the vehicle control function by the first key according to user operation in cases in which the prescribed communication with the second key has not been confirmed.

An information processing device of a fifth aspect is the information processing device of any one of the first to fourth aspects, wherein the processing section notifies a message expressing that the user operation is non-receivable in a case in which the prescribed communication with the second key has not been confirmed by the confirmation section.

In the information processing device of the fifth aspect, the message expressing that the user operation is non-receivable is notified in a case in which the prescribed communication with the second key has not been confirmed. The user can accordingly be notified that the user operation to disable the vehicle control function by the first key according to user operation is non-receivable in a case in which the prescribed communication with the second key has not been confirmed.

An information processing device of a sixth aspect is the information processing device any one of the first to fifth aspects, wherein the confirmation section confirms whether or not the prescribed communication can be performed with the second key by cross-checking identification information of the second key capable of the prescribed communication inside the vehicle against identification information of the second key which is pre-recorded.

In the information processing device of the sixth aspect, capability to perform the prescribed communication with the second key is not confirmed in cases in which the identification information of the second key which is capable of the prescribed communication inside the vehicle does not cross-check against the identification information of the second key which is pre-recorded. This information processing device is accordingly able to suppress disabling of the vehicle control function by the first key according to user operation in cases in which the identification information of the second key capable of the prescribed communication inside the vehicle does not cross-check against the identification information of the second key which is pre-recorded.

The information processing device of a seventh aspect is the information processing device of any one of the first to fifth aspects, wherein the confirmation section confirms whether or not the prescribed communication can be performed with the second key by cross-checking identification information of the second key, which a user has brought close to a near field communication section provided inside the vehicle against identification information of the second key which is pre-recorded.

In the information processing device of the seventh aspect, capability to perform the prescribed communication with the second key is not confirmed in cases in which the identification information of the second key the user has brought close to a near field communication section provided inside the vehicle does not cross-check against the identification information of the second key which is pre-recorded. This information processing device is accordingly able to suppress disabling of the vehicle control function by the first key according to user operation in cases in which the identification information of the second key the user has brought close to the near field communication section provided inside the vehicle does not cross-check against the identification information of the second key which is pre-recorded.

The information processing device of an eighth aspect is the information processing device of any of the first to fifth aspects, wherein the confirmation section confirms the prescribed communication can be performed with the second key by transmitting a response request signal for the second key, which is pre-recorded, and determining whether or not a response signal has been received from the second key.

In the information processing device of the eighth aspect, the response request signal for the pre-recorded second key is transmitted and capability to perform the prescribed communication with the second key is not confirmed in cases in which the response signal has been received from the second key. This information processing device accordingly is able to suppress disabling of the vehicle control function by the first key according to the user operation in cases in which the response request signal for the second key, which is pre-recorded, is transmitted and the response signal is not received from the second key.

An information processing device of a ninth aspect is the information processing device of any one of the first to fifth aspects, wherein the confirmation section checks whether or not the prescribed communication can be performed with the second key by determining whether or not a signal emitted from the second key, which is pre-recorded, has been received.

In the information processing device of the ninth aspect, capability to perform the prescribed communication with the second key is not confirmed in cases in which the signal emitted from the second key, which is pre-recorded, has not been received. This information processing device is accordingly able to suppress disabling of the vehicle control function by the first key according to the user operation in cases in which the signal emitted from the pre-recorded second key is not received.

A tenth aspect is a vehicle including the information processing device of any one of the first to ninth aspects, and a locking section configured to perform locking and unlocking of an opening and closing section that partitions an interior of the vehicle from an exterior of the vehicle.

The vehicle of the tenth aspect is a vehicle in which locking and unlocking of an opening and closing section is performed by a key. This vehicle is accordingly able to suppress the occurrence of inconvenience even when a function to perform locking and unlocking of the opening and closing section by a key is disabled.

An eleventh aspect is an information processing method including a receiving section that receives user operation for disabling a vehicle control function by a first key configured to be used to control a vehicle, a confirmation section that confirms whether a prescribed communication can be performed with a second key that is a key configured to be used to control the vehicle and that is different from the first key, and a processing section that performs processing to suppress disabling of the vehicle control function by the first key according to the user operation in a case in which the prescribed communication with the second key has not been confirmed by the confirmation section.

In the information processing method of the eleventh aspect, the confirmation section confirms whether the prescribed communication can be performed with a second key that is a key configured to be used to control the vehicle and that is different from the first key. The processing section performs processing to suppress disabling of the vehicle control function by the first key according to the user operation in cases in which the prescribed communication with the second key has not been confirmed by the confirmation section. This information processing method is accordingly able to suppress the occurrence of inconvenience even when the vehicle control function by key has been disabled.

A twelfth aspect is a non-transitory recording medium storing a program that causes a computer to execute processing, the processing including receiving user operation for disabling a vehicle control function by a first key configured to be used to control a vehicle, confirming whether a prescribed communication can be performed with a second key that is a key configured to be used to control the vehicle and that is different from the first key, and processing to suppress disabling of the vehicle control function by the first key according to the user operation in cases in which the prescribed communication with the second key has not been confirmed.

The program recorded on the non-transitory recording medium of the twelfth aspect checks whether a prescribed communication can be performed with a second key that is a key configured to be used to control the vehicle and that is different from the first key. Then the program performs processing to suppress disabling of the vehicle control function by the first key according to the user operation in a case in which the prescribed communication with the second key has not been confirmed. This program is accordingly able to suppress the occurrence of inconvenience even when a vehicle control function by a key is disabled.

The present disclosure enables the occurrence of inconvenience to be suppressed even when a vehicle control function by a key is disabled.

BRIEF DESCRIPTION OF THE DRAWINGS

Exemplary embodiments of the present disclosure will be described in detail based on the following figures, wherein:

FIG. 2 is a block diagram illustrating a hardware configuration of a vehicle according to the first exemplary embodiment;

FIG. 6 is a diagram illustrating an example of a customized setting screen;

FIG. 15 is a block diagram illustrating a hardware configuration of a smartphone of the third exemplary embodiment;

DETAILED DESCRIPTION

Explanation follows regarding a vehicle system according to exemplary embodiments of the present disclosure, with reference to FIG. 1 to FIG. 19.

First Exemplary Embodiment

Figure 1:
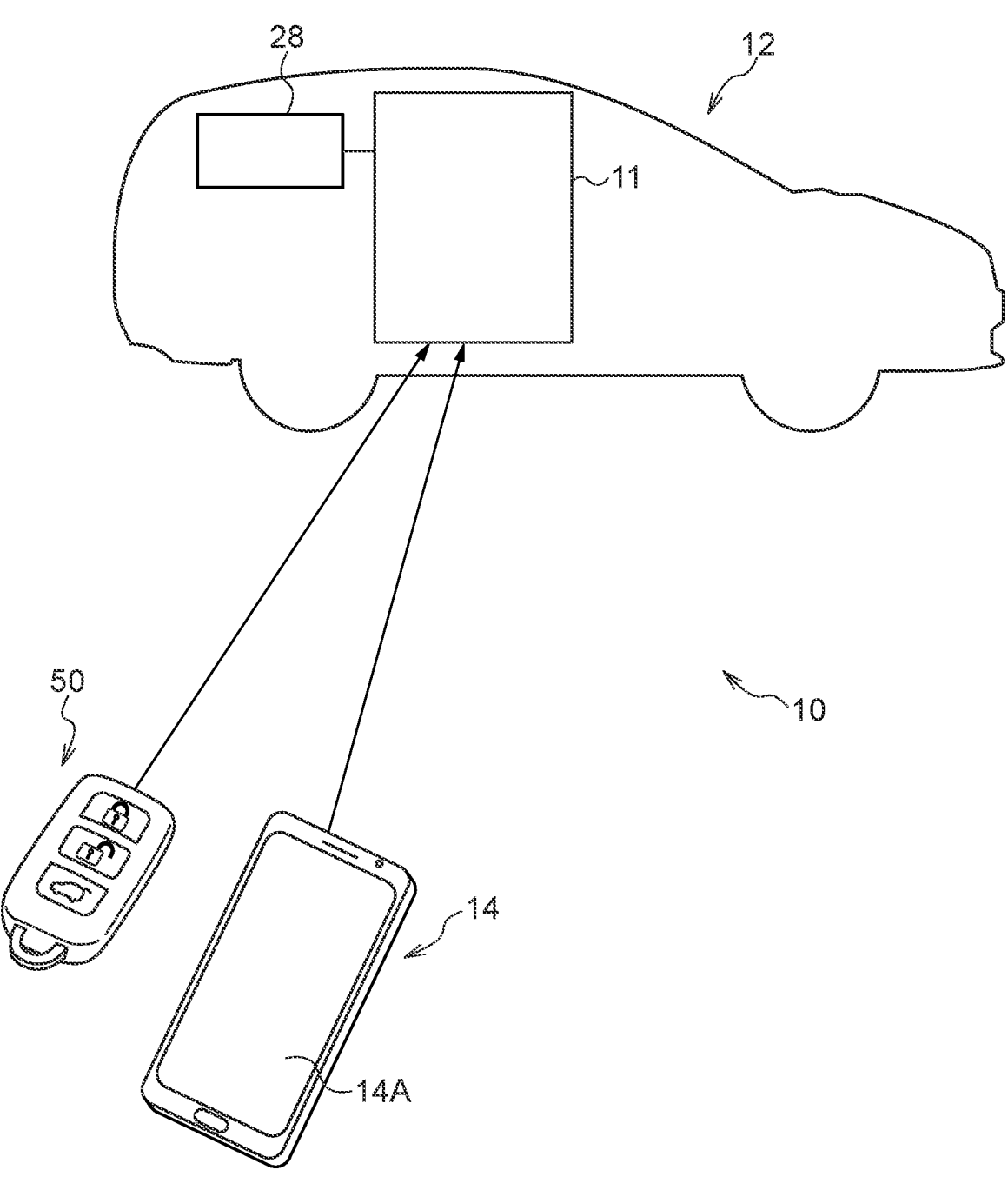
FIG. 1 is a diagram illustrating a schematic configuration of a vehicle system according to a first exemplary embodiment.

FIG. 1 is a block diagram illustrating a schematic configuration of a vehicle system 10 according to a first exemplary embodiment.

Overall Configuration

As illustrated in FIG. 1, the vehicle system 10 according to an exemplary embodiment of the present disclosure present exemplary embodiment is configured including a vehicle 12, and a smartphone 14 serving as a terminal to control the vehicle 12. The vehicle system 10 includes a physical key 50 that is a portable device for controlling the vehicle 12 and specific to the vehicle 12. The physical key 50 is an example of a second key.

The vehicle 12 is configured so as to be capable of receiving direct local communication from the smartphone 14 and the physical key 50, without communicating over a network. Such communication encompasses wireless communication and infrared communication.

A door lock unit 28 performs locking and unlocking of a driver door, a front passenger door, rear doors, and a back door.

Figure 2:
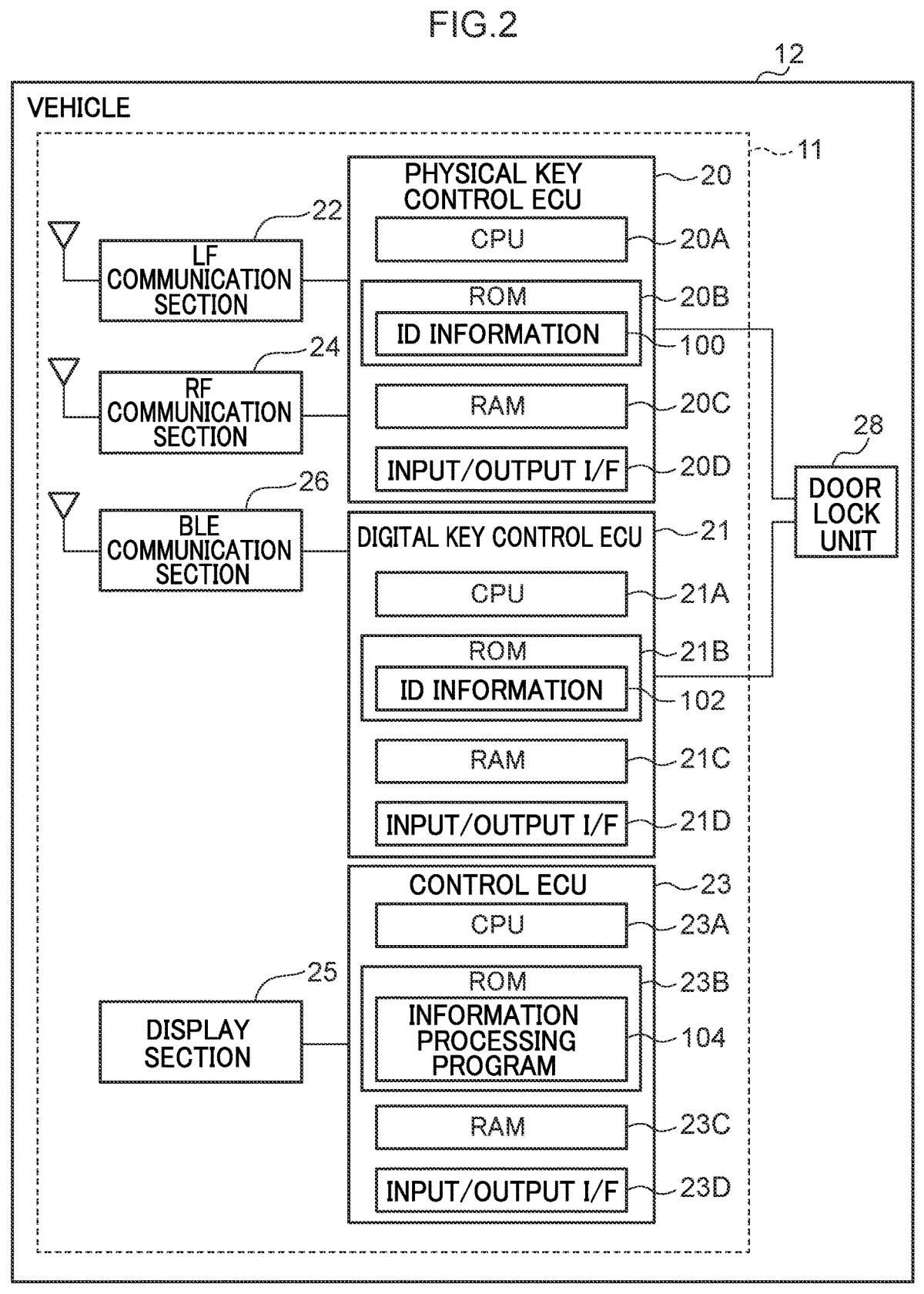

As illustrated in FIG. 2, an onboard unit 11 installed to the vehicle 12 includes a physical key electronic control unit (ECU) 20, a digital key control ECU 21, a low frequency (LF) communication section 22, a control ECU 23, a radio frequency (RF) communication section 24, a display section 25, and a Bluetooth (registered trademark) low energy (BLE) communication section 26.

The LF communication section 22 is a communication unit that performs wireless communication in an LF band, and transmits a request signal toward an LF communication section 42, described later. The LF communication section 22 of the present exemplary embodiment is respectively installed to the driver door, front passenger door, rear doors, and back door.

The RF communication section 24 is a communication unit that performs wireless communication in an RF band, and receives a response signal from an RF communication section 44, described later.

The BLE communication section 26 is a communication unit that performs wireless communication using Bluetooth (registered trademark), and performs communication with a BLE communication section 14C, described later.

The physical key control ECU 20 is configured including a central processing unit (CPU) 20A, a read only memory (ROM) 20B, random access memory (RAM) 20C, and an input/output interface (I/F) 20D. The CPU 20A, the ROM 20B, the RAM 20C, and the input/output I/F 20D are connected together through a non-illustrated internal bus so as to be able to communicate with each other.

The CPU 20A is a central processing unit that executes various programs and controls each section. Namely, the CPU 20A reads a program from the ROM 20B, and executes the program using the RAM 20C as workspace.

The ROM 20B is stored with various programs and various data. Identification (ID) information 100 is stored in the ROM 20B in the present exemplary embodiment.

The ID information 100 is stored with ID information unique to the physical key 50.

The RAM 20C functions as workspace for temporarily storing programs and data.

The input/output I/F 20D is an interface for respectively communicating with the LF communication section 22, the RF communication section 24, and the door lock unit 28.

The physical key control ECU 20 may include storage serving as a storage section, either in addition to the ROM 20B or instead of the ROM 20B. Such storage is, for example, configured by a hard disk drive (HDD) or solid state drive (SSD).

Figure 3:
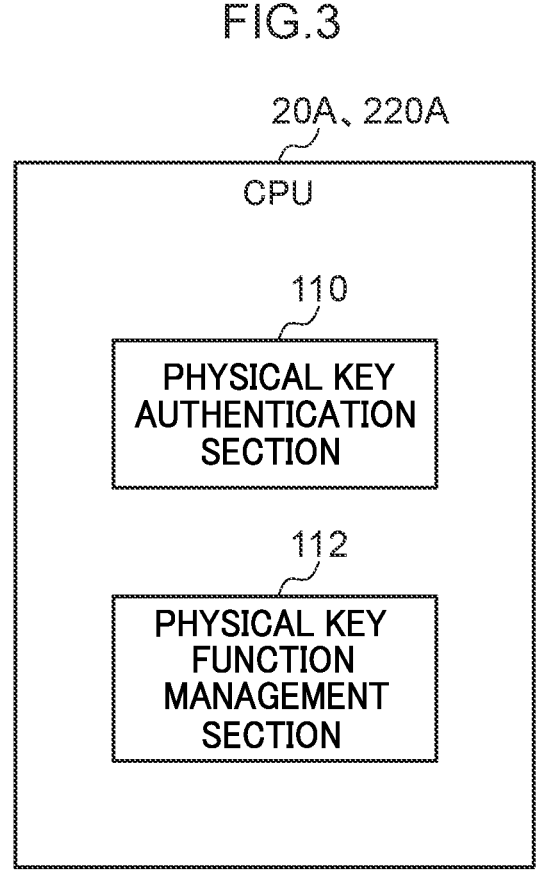
FIG. 3 is a block diagram illustrating an example of a functional configuration of a CPU in a physical key control ECU in an onboard unit of the first and a second exemplary embodiment.

As illustrated in FIG. 3, in the physical key control ECU 20 of the present exemplary embodiment the CPU 20A functions as a physical key authentication section 110 and a physical key function management section 112 by executing a program.

The physical key authentication section 110 performs authentication processing on the physical key 50 by cross-checking an ID of the physical key 50, based on wireless communication in the LF communication section 22 and the RF communication section 24 with the physical key 50, against the ID information 100. Specifically, the physical key authentication section 110 uses the LF communication section 22 to transmit a response request signal to the physical key 50 having the same ID as the ID information 100, and determines that authentication of the physical key 50 has succeeded in cases in which the response signal is received from the physical key 50 using the RF communication section 24.

In cases in which the authentication of the physical key 50 has succeeded, the physical key authentication section 110 executes vehicle control, including door-locking/unlocking in the door lock unit 28, switching power ON for the vehicle 12, and starting the engine, based on wireless communication by the LF communication section 22 and the RF communication section 24 with the physical key 50.

The physical key function management section 112 either activates or disables the vehicle control function by the physical key 50 according to settings based on user operation.

The digital key control ECU 21 is configured including a CPU 21A, ROM 21B, RAM 21C, and an input/output I/F 21D. The CPU 21A, the ROM 21B, the RAM 21C, and the input/output I/F 21D are connected together through a non-illustrated internal bus so as to be able to communicate with each other.

The respective functions of the CPU 21A, the ROM 21B, the RAM 21C, and the input/output I/F 21D are the same as those of the CPU 20A, the ROM 20B, the RAM 20C, and the input/output I/F 20D described above.

ID information 102 is stored in the ROM 21B of the present exemplary embodiment. The ID information 102 is stored with information of an ID unique to a digital key recorded on the smartphone 14. The digital key is an example of a first key.

The input/output I/F 21D is an interface for respectively communicating with the BLE communication section 26 and the door lock unit 28.

The digital key control ECU 21 may include storage serving as a storage section, either in addition to the ROM 21B or instead of the ROM 21B. Such storage may, for example, be configured by a HDD or an SSD.

Figure 4:
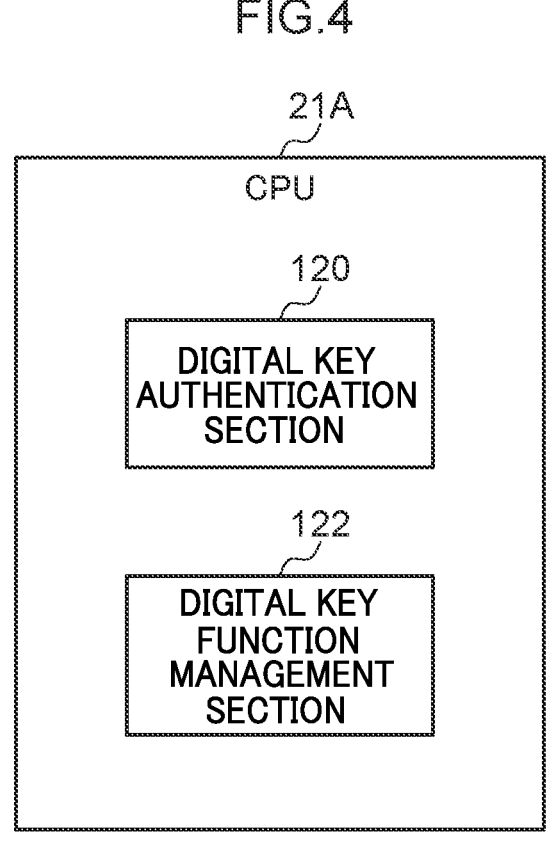
FIG. 4 is a block diagram illustrating an example of a functional configuration of a CPU in a digital key control ECU in an onboard unit of the first exemplary embodiment.

As illustrated in FIG. 4, in the digital key control ECU 21 of the present exemplary embodiment the CPU 21A functions as a digital key authentication section 120 and a digital key function management section 122 by executing a program.

The digital key authentication section 120 performs digital key authentication processing by cross-checking a digital key ID recorded on the smartphone 14, based on wireless communication with smartphone 14 using the BLE communication section 26, against the ID information 102. In cases in which digital key authentication has succeeded, the digital key authentication section 120 executes vehicle control, including door-locking/unlocking in the door lock unit 28, switching power ON for the vehicle 12, and starting the engine based on wireless communication with the smartphone 14 using the BLE communication section 26.

The digital key function management section 122 performs activation or disabling of the vehicle control function by the digital key according to settings based on user operation.

The control ECU 23 is configured including a CPU 23A, ROM 23B, RAM 23C, and an input/output I/F 23D. The CPU 23A, the ROM 23B, the RAM 23C, and the input/output I/F 23D are connected together through a non-illustrated internal bus so as to be able to communicate with each other. The CPU 23A is an example of a processor, and the RAM 23C is an example of memory.

The respective functions of the CPU 23A, the ROM 23B, the RAM 23C, and the input/output I/F 23D are the same as those of the CPU 20A, the ROM 20B, the RAM 20C, and the input/output I/F 20D described above.

An information processing program 104 is stored in the ROM 23B of the present exemplary embodiment.

The input/output I/F 23D is an interface for communicating with the display section 25.

The control ECU 23 may include storage serving as a storage section, either in addition to the ROM 23B or instead of the ROM 23B. Such storage is, for example, configured by a HDD or an SSD.

Vehicle control, such as locking and unlocking of a door, switching vehicle power ON, and starting the engine, is possible even without a physical key, as long as there is a smartphone recorded with the digital key.

When a user wants to disable the digital key function by vehicle settings, in cases in which only a smartphone is carried and there is no physical key carried, then locking and unlocking of a door, switching vehicle power ON, and starting the engine would no longer be possible were the digital key function to be disabled. Moreover, the digital key function would also be unable to be activated due to not being able to switch the vehicle power ON.

Thus the present exemplary embodiment adopts a configuration in which the vehicle control function is not able to be disabled using the digital key in cases in which the onboard unit 11 fails to perform a prescribed communication with the physical key 50.

Figure 5:
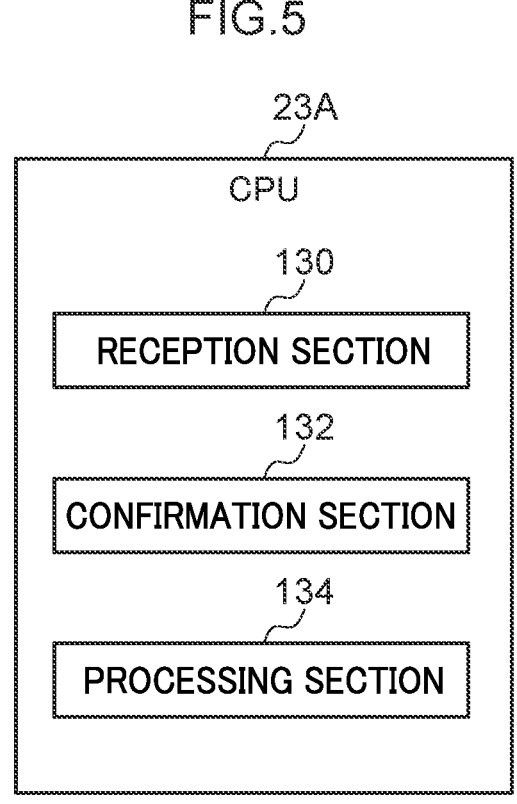
FIG. 5 is a block diagram illustrating an example of a functional configuration of a CPU in a control ECU in an onboard unit of the first exemplary embodiment.

Specifically, as illustrated in FIG. 5, in the control ECU 23 of the present exemplary embodiment, the CPU 23A functions as a reception section 130, a confirmation section 132, and a processing section 134 by executing the information processing program 104.

The reception section 130 receives a user operation for disabling the vehicle control function by the digital key.

Specifically, the reception section 130 receives user operation on a user interface that is displayed on the display section 25 for disabling the vehicle control function by the digital key.

For example, a customized setting screen 25A illustrated in FIG. 6 is displayed on the display section 25, and user operation is received. In FIG. 6 the customized setting screen 25A is illustrated for an example that includes a digital key function-OFF button 25B for disabling the vehicle control function by digital key, a smart entry function-OFF button 25C for disabling a smart entry function, and a power back door function-OFF button 25D for disabling a power back door function.

The confirmation section 132 checks whether or not prescribed communication with the physical key 50 is able to be performed. Specifically, the confirmation section 132 determines that prescribed communication can be made with the physical key 50 in cases in which the physical key authentication section 110 of the physical key control ECU 20 has succeeded in authentication of the physical key 50.

The processing section 134 performs processing to suppress disabling of the vehicle control function by digital key according to user operation in cases in which the prescribed communication with the physical key 50 is not confirmed by the confirmation section 132. Specifically, the processing section 134 controls such that a user operation for disabling the vehicle control function by digital key is not receivable by the user interface being displayed on the display section 25 in cases in which the prescribed communication with the physical key 50 is not confirmed by the confirmation section 132. For example, the processing section 134 turns down the tone of display of the digital key function-OFF button 25B on the customized setting screen 25A, as illustrated in FIG. 6, and also disables the digital key function-OFF button 25B.

Physical Key

Figure 7:
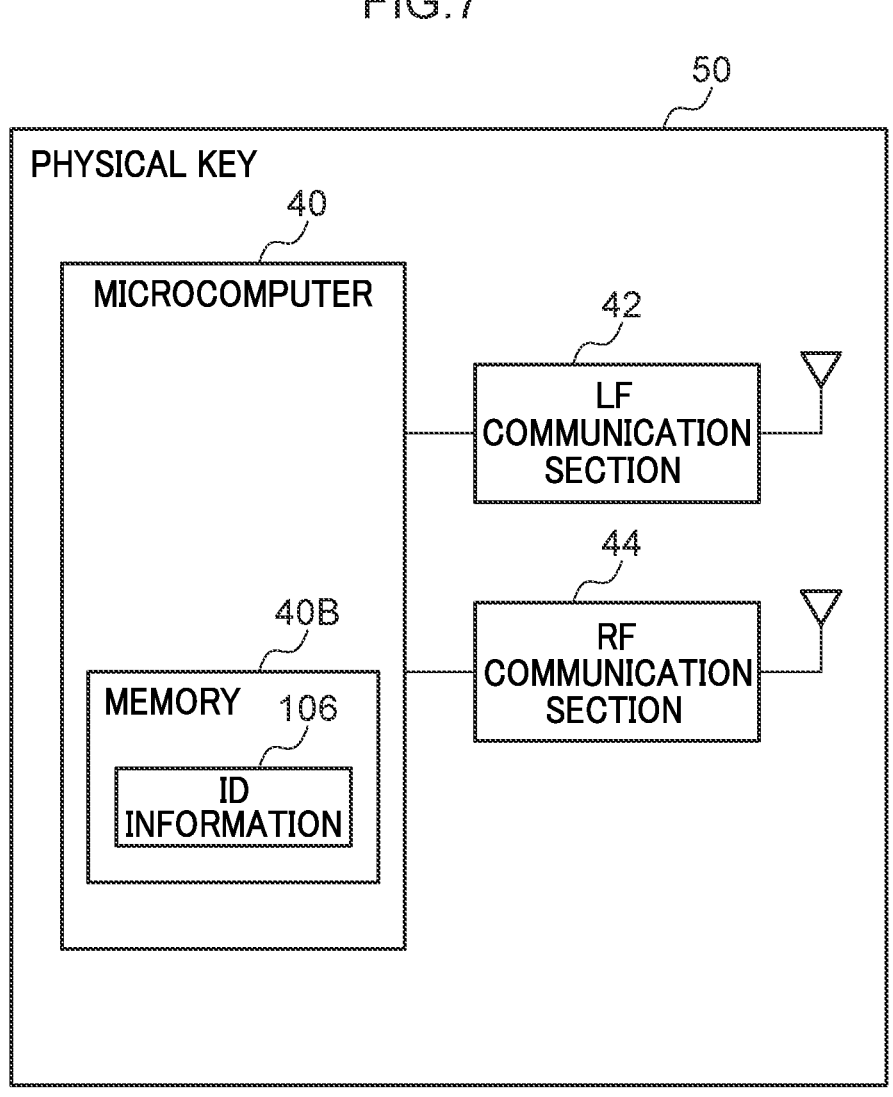
FIG. 7 is a block diagram illustrating a hardware configuration of a physical key.

The physical key 50 such as that illustrated in FIG. 7 is an electronic device able to be carried by a user of the vehicle 12. The physical key 50 includes a microcomputer 40, an LF communication section 42, and an RF communication section 44. The microcomputer 40 is configured including at least a non-volatile memory 40B. The memory 40B is stored with ID information 106 that is information unique to the physical key 50.

The LF communication section 42 is a communication unit that performs wireless communication in an LF band, and receives a response request signal from the LF communication section 22. The RF communication section 44 is a transmission unit that performs wireless communication in an RF band, and transmits a response signal to the RF communication section 24.

The microcomputer 40 cross-checks the ID information 100 contained in the response request signal received from the LF communication section 22 against the ID information 106 of the memory 40B, and transmits the response signal using the RF communication section 44 in cases in which there is a match. Moreover, on receipt of a user operation to an operation section (not illustrated in the drawings) provided to the physical key 50, for door-locking or unlocking of the door lock unit 28, switching power ON to the vehicle 12, or starting the engine, the microcomputer 40 transmits a signal corresponding to the user operation to the RF communication section 24 of the onboard unit 11 using the RF communication section 44.

Smartphone

Figure 8:
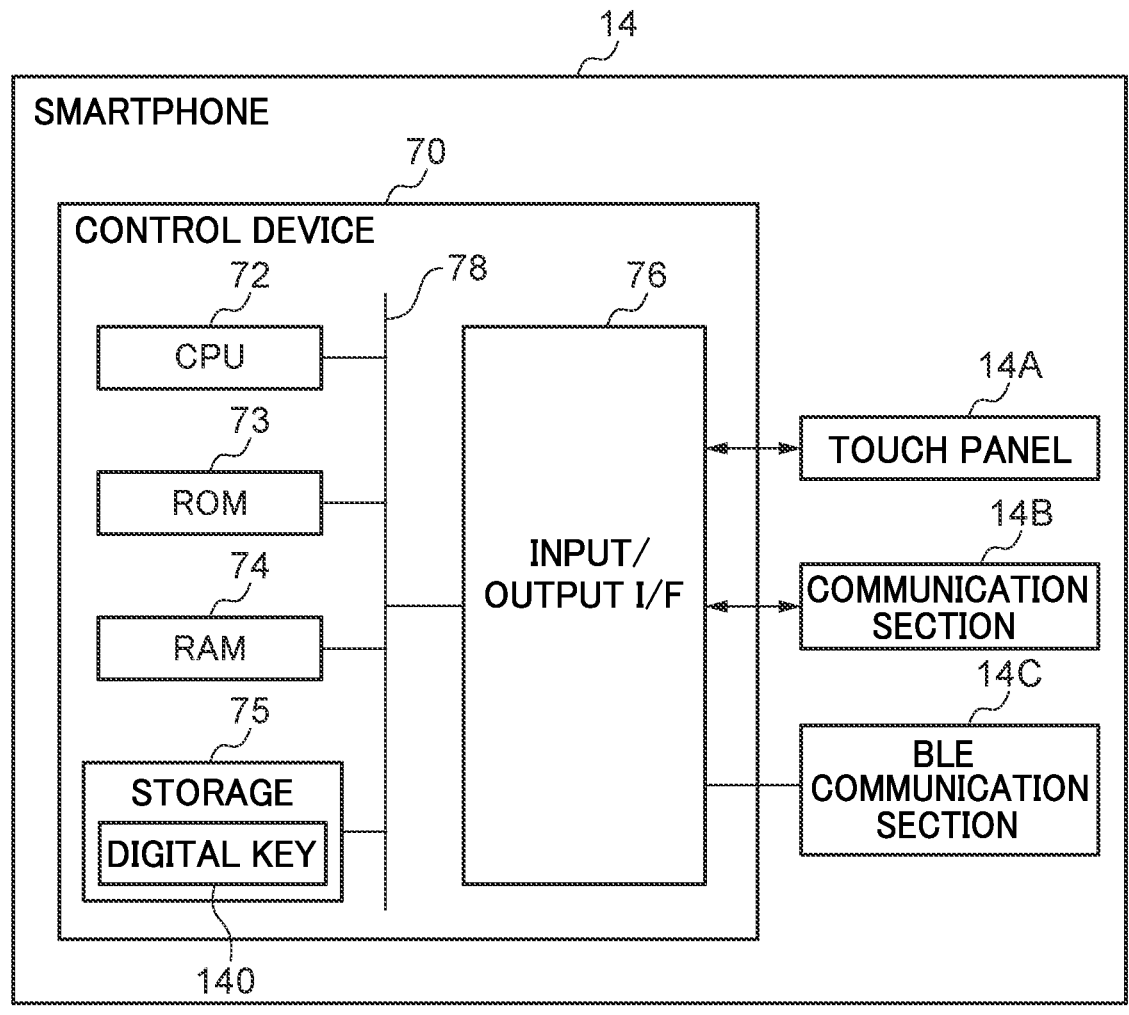
FIG. 8 is a block diagram illustrating a hardware configuration of a smartphone of the first exemplary embodiment.

The smartphone 14 is a communication terminal carried by a user. In cases in which authentication of the recorded digital key has succeeded by communication with the onboard unit 11, the smartphone 14 of the present exemplary embodiment is configured to receive user operation for locking or unlocking of the door lock unit 28, switching power ON to the vehicle 12, or starting the engine, and thereby enable door-locking or unlocking of the door lock unit 28, switching power ON to the vehicle 12, and starting the engine. As illustrated in FIG. 8, the smartphone 14 is configured including a control device 70, a touch panel 14A, a communication section 14B, and the BLE communication section 14C.

The control device 70 is equipped with hardware including a CPU 72 as an example of a processor, ROM 73, RAM 74, storage 75, and an input/output I/F 76. The CPU 72, the ROM 73, the RAM 74, the storage 75, and the input/output I/F 76 are connected together through a bus 78.

Respective functions of the CPU 72, the ROM 73, the RAM 74, and the input/output I/F 76 are the same as those of the CPU 20A, the ROM 20B, the RAM 20C, and the input/output I/F 20D described above. Internal storage of the smartphone 14, as well as a micro SD card, are applicable as the storage 75 of the present exemplary embodiment.

The CPU 72 reads a program from the ROM 73, and executes the program using the RAM 74 as workspace. In the present exemplary embodiment a digital key 140 is recorded in the storage 75. A vehicle control application program is stored in the ROM 73 for performing vehicle control by user operation using the digital key 140.

The touch panel 14A, the communication section 14B, and the BLE communication section 14C are connected to the control device 70 of the present exemplary embodiment through the input/output I/F 76. The touch panel 14A, the communication section 14B, and the BLE communication section 14C may be directly connected to the bus 78.

When the vehicle control application program is executed, the CPU 72 displays icons on the touch panel 14A respectively for door locking or unlocking of the door lock unit 28, switching ON the power of the vehicle 12, and starting the engine. When a user has performed on operation on one of these icons, a signal to instruct vehicle control corresponding to the icon operated (door locking or unlocking of the door lock unit 28, switching the power of the vehicle 12 ON, or starting the engine) is transmitted to the BLE communication section 26 of the onboard unit 11 using the BLE communication section 14C.

Processing Flow

Figure 9:
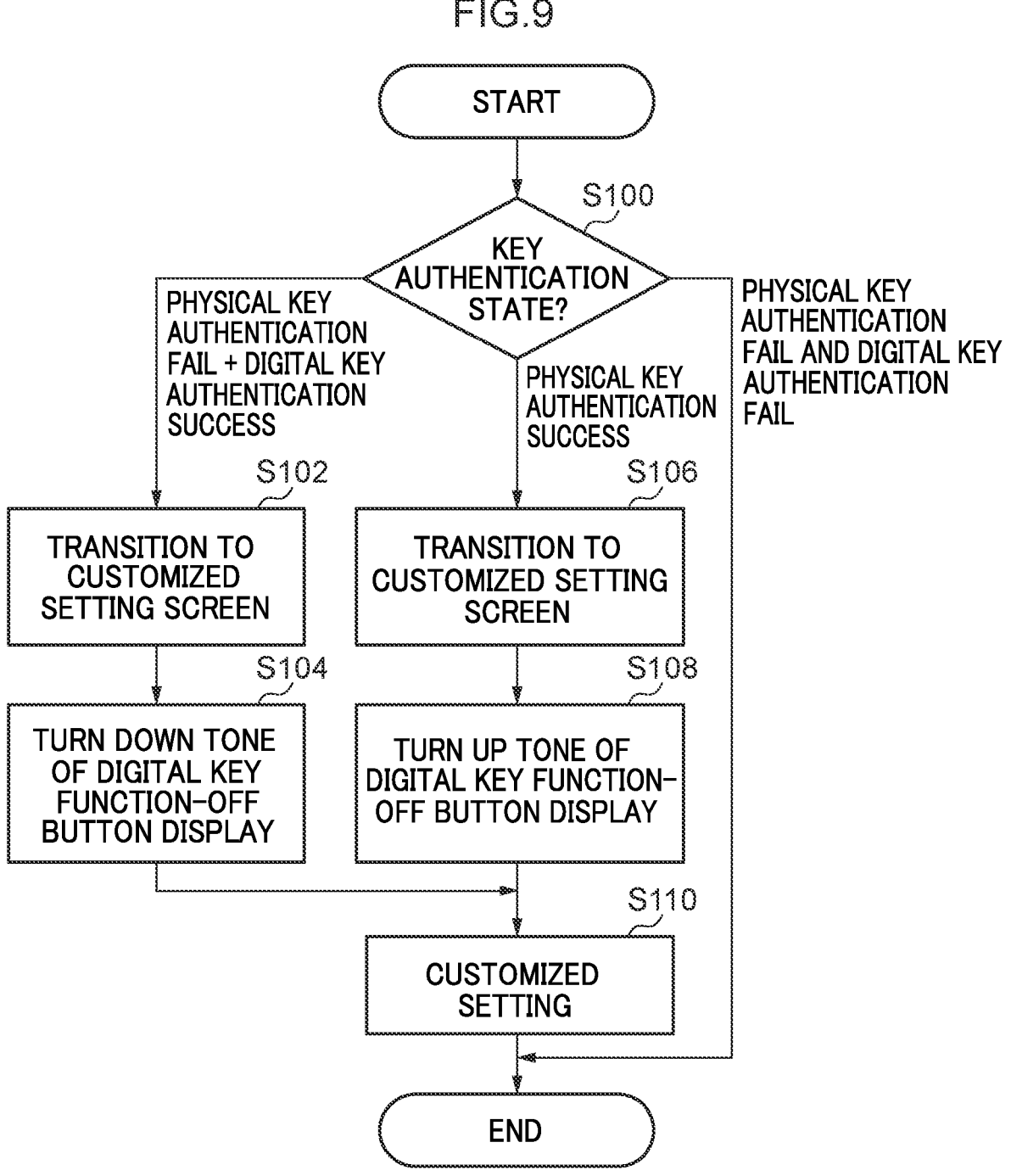
FIG. 9 is a flowchart illustrating an example of a flow of customized setting processing executed in a CPU of a control ECU in an onboard unit of the first exemplary embodiment.

Next, explanation follows regarding a flow of processing in the vehicle system 10 of the present exemplary embodiment, with reference to a flowchart of FIG. 9.

First, the smartphone 14 starts the vehicle control application program through operation by a user present in the vicinity of the vehicle 12. The smartphone 14 or the physical key 50 then receives a door unlock operation through operation by the user, and the smartphone 14 or the physical key 50 transmits a signal corresponding to the door unlock operation toward the onboard unit 11, and the onboard unit 11 unlocks the door lock unit 28.

When the user steps into the vehicle 12, the physical key control ECU 20 of the onboard unit 11 performs authentication of the physical key 50. The digital key control ECU 21 also performs authentication of the digital key 140 recorded on the smartphone 14.

When customized setting is instructed on the onboard unit 11 by user operation, the CPU 23A of the control ECU 23 of the onboard unit 11 performs customized setting processing as illustrated in FIG. 9 by executing the information processing program 104.

First, at step S100, the CPU 23A functions as the confirmation section 132 and confirms an authentication state of the physical key 50 and an authentication state of the digital key 140. The CPU 23A ends the customized setting processing in cases in which both authentication of the physical key 50 fails and authentication of the digital key 140 fails. Moreover, the CPU 23A transitions processing to step S102 in cases in which authentication of the physical key 50 fails but authentication of the digital key 140 succeeds. The CPU 23A transitions to step S106 in cases in which the authentication of the physical key 50 succeeds.

At step S102, the CPU 23A functions as the reception section 130 and transitions the screen being displayed on the display section 25 to the customized setting screen 25A.

At step S104, the CPU 23A functions as the processing section 134 and turns down the tone of display of the digital key function-OFF button 25B on the customized setting screen 25A and also disables the digital key function-OFF button 25B, and then transitions to step S110.

At step S106, the CPU 23A functions as the reception section 130 and transitions the screen being displayed on the display section 25 to the customized setting screen 25A.

At step S108, the CPU 23A functions as the processing section 134 and turns up the tone of display of the digital key function-OFF button 25B on the customized setting screen 25A and also activates the digital key function-OFF button 25B, and then transitions to step S110.

At step S110, the CPU 23A functions as the reception section 130 and receives user operation on the customized setting screen 25A, performs setting so as to disable the digital key function, the smart entry function, or the power back door function, and then ends the customized setting processing.

First Exemplary Embodiment Summary

The vehicle 12 of the present exemplary embodiment is configured such that processing is performed so as to suppress disabling of the vehicle control function by the digital key 140 according to user operation in cases in which the control ECU 23 has checked whether or not the prescribed communication can be made with the physical key 50 and the prescribed communication with the physical key 50 is not confirmed. Thus the control ECU 23 makes it such that the vehicle control function using the digital key 140 is not able to be disabled in cases in which the prescribed communication is not able to be performed with the physical key 50. This enables a reduction in the possibility of losing vehicle control due to mistaken operation in cases in which the user is only holding the smartphone 14 recorded with the digital key 140.

Note that although explanation in the present exemplary embodiment is of an example in which the physical key authentication section 110 uses the LF communication section 22 to transmit a response request signal to the physical key 50 including an ID the same as the ID information 100, and authentication of the physical key 50 is determined to have succeeded in cases in which a response signal has been received from the physical key 50 using the RF communication section 24, there is no limitation thereto. For example, a configuration may be adopted such that the physical key 50 emits a signal periodically, and the physical key authentication section 110 performs authentication processing on the physical key 50 by cross-checking the ID of the physical key 50 contained in the signal emitted from the physical key 50 in the vehicle 12 against the ID information 100.

Moreover, although explanation in the present exemplary embodiment is of an example in which the screen being displayed on the display section 25 is transitioned to the customized setting screen 25A after the authentication state of the physical key 50 and the authentication state of the digital key 140 have been confirmed, there is no limitation thereto. The authentication state of the physical key 50 and the authentication state of the digital key 140 may be checked while the screen being displayed on the display section 25 is being transitioned to the customized setting screen 25A.

Second Exemplary Embodiment

In the first exemplary embodiment the physical key performs wireless communication using an LF band and an RF band, and vehicle control is performed. In contrast thereto, the second exemplary embodiment differs from the first exemplary embodiment in that a card for performing near field communication (NFC) is employed. Explanation follows regarding points of difference to the first exemplary embodiment. Note that the same reference numerals are appended to same configuration, and explanation thereof will be omitted.

Overall Configuration

Figure 10:
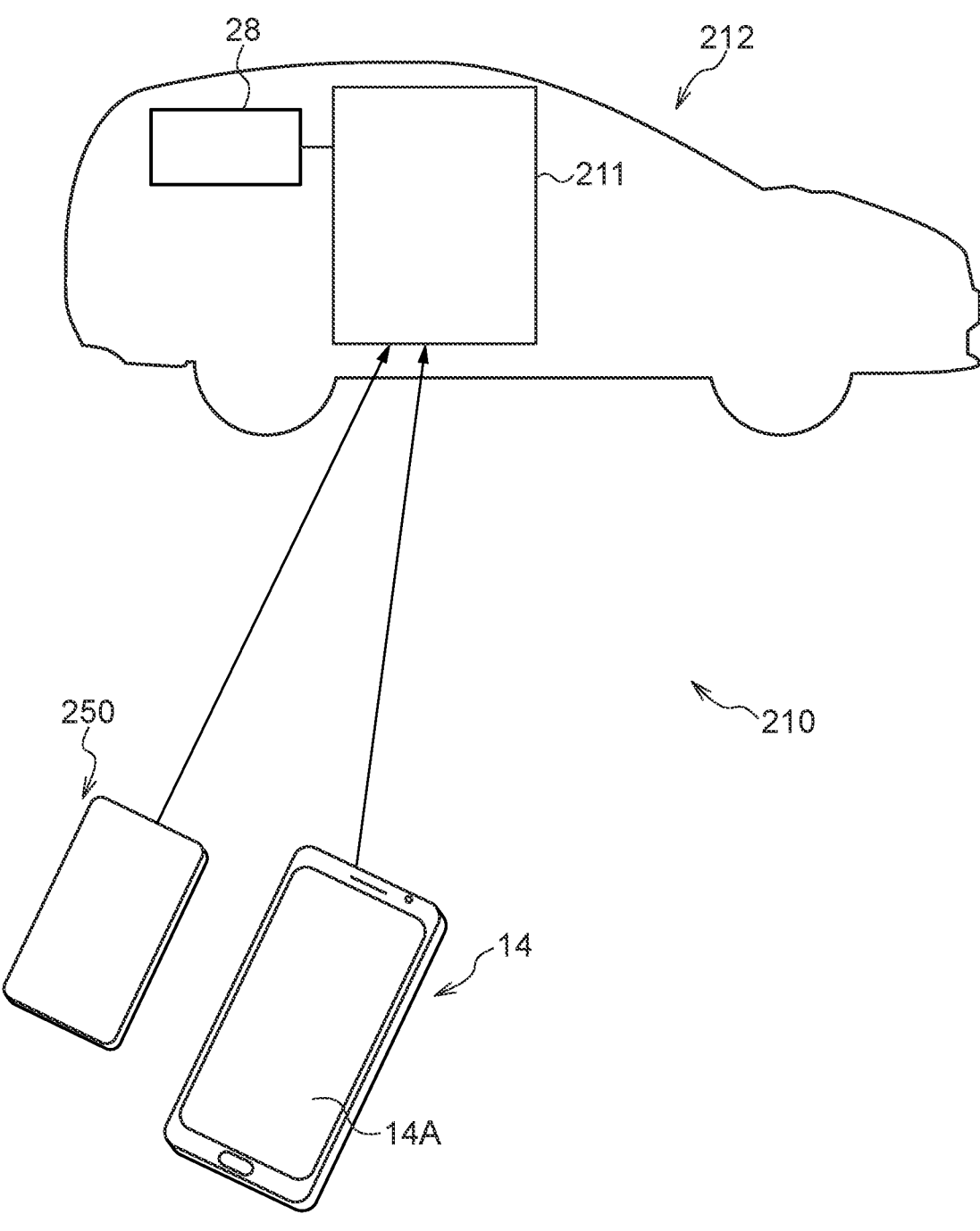
FIG. 10 is a diagram illustrating a schematic configuration of a vehicle system according to the second exemplary embodiment.

As illustrated in FIG. 10, a vehicle system 210 according to the present exemplary embodiment includes a vehicle 212, a smartphone 14, and an NFC card 250, which is a card specific to the vehicle 212 for controlling the vehicle 212. The NFC card 250 is an example of a second key.

The vehicle 212 is configured so as to be capable of receiving direct local communication from the smartphone 14 and the NFC card 250, without communicating over a network. This direct communication includes wireless communication and infrared communication.

Figure 11:
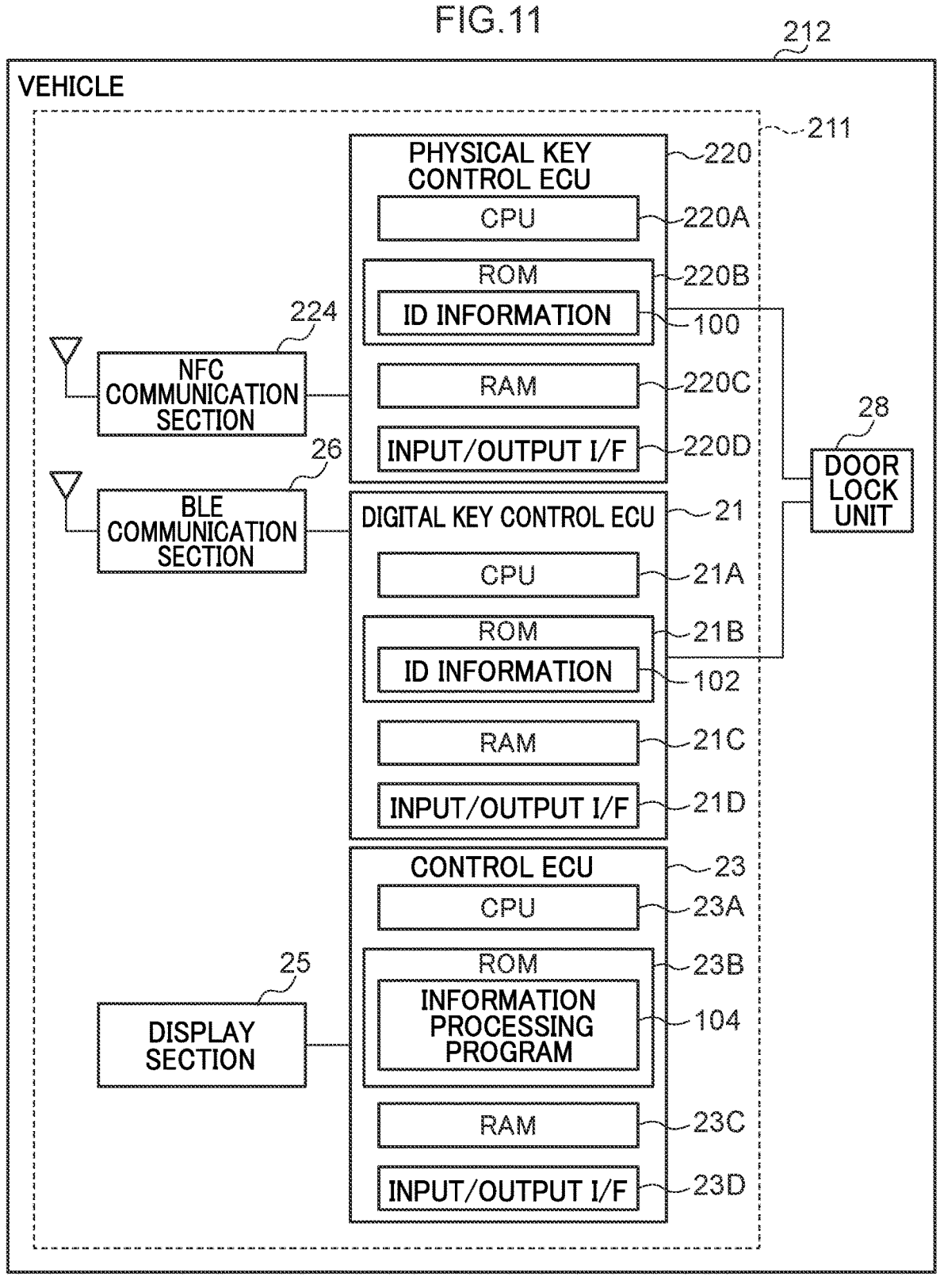
FIG. 11 is a block diagram illustrating a hardware configuration of a vehicle according to the second exemplary embodiment.

As illustrated in FIG. 11, an onboard unit 211 installed to the vehicle 212 includes a physical key control ECU 220, a digital key control ECU 21, a NFC communication section 224, a control ECU 23, a display section 25, and a BLE communication section 26.

The NFC communication section 224 is a communication unit that performs wireless communication using an NFC band, and performs communication with the NFC card 250 brought close by a user. The NFC communication section 224 of the present exemplary embodiment is placed inside the vehicle 212.

The physical key control ECU 220 is configured including a CPU 220A, ROM 220B, RAM 220C, and an input/output I/F 220D. The CPU 220A, the ROM 220B, the RAM 220C, and the input/output I/F 220D are connected so as to be able to communicate with each other through a non-illustrated internal bus.

The respective functions of the CPU 220A, the ROM 220B, the RAM 220C, and the input/output I/F 220D are the same as those of the CPU 20A, the ROM 20B, the RAM 20C, and the input/output I/F 20D described above.

ID information 100 is stored in the ROM 220B of the present exemplary embodiment. The ID information 100 is unique ID information stored on the NFC card 250.

As illustrated in FIG. 3, in the physical key control ECU 220 of the present exemplary embodiment, the CPU 220A functions as the physical key authentication section 110 and the physical key function management section 112 by executing a program. Note that in the digital key control ECU 21 the CPU 21A may be configured so as to function as the physical key authentication section 110 and the physical key function management section 112 by executing a program.

The physical key authentication section 110 performs authentication processing on the NFC card 250 by cross-checking the ID of the NFC card 250, based on wireless communication in the NFC communication section 224 with the NFC card 250, against the ID information 100. Specifically, the physical key authentication section 110 determines that the authentication of the NFC card 250 has succeeded when a response request signal received from the NFC card 250 includes the same ID as the ID information 100 by the NFC communication section 224.

The physical key authentication section 110 executes vehicle control, including switching power ON to the vehicle 212 and starting the engine, in cases in which authentication of the NFC card 250 has succeeded.

The physical key function management section 112 performs activation or disabling of the vehicle control function by the NFC card 250 according to settings based on user operation.

As illustrated in FIG. 5, in the control ECU 23 of the present exemplary embodiment the CPU 23A functions as the reception section 130, the confirmation section 132, and the processing section 134 by executing the information processing program 104.

The reception section 130 receives user operation for disabling the vehicle control function by the digital key 140. Specifically, the reception section 130 receives user operation for disabling the vehicle control function by the digital key 140 on a user interface displayed on the display section 25.

For example, the customized setting screen 25A illustrated in FIG. 6 is displayed on the display section 25, and user operation is received thereon.

The confirmation section 132 checks whether or not the prescribed communication can be performed with the NFC card 250. Specifically, the confirmation section 132 determines that the prescribed communication can be performed with the NFC card 250 in cases in which authentication of the NFC card 250 has succeeded using the physical key authentication section 110 of the physical key control ECU 220.

The processing section 134 performs processing to suppress disabling of the vehicle control function by the digital key 140 according to user operation in cases in which the prescribed communication with the NFC card 250 has not been confirmed by the confirmation section 132. Specifically, the processing section 134 controls such that user operation for disabling the vehicle control function by the digital key 140 is not receivable on the user interface being displayed on the display section 25 in cases in which the prescribed communication with the NFC card 250 has not been confirmed by the confirmation section 132. For example, the processing section 134 turns down the tone of display of the digital key function-OFF button 25B on the customized setting screen 25A, as illustrated in FIG. 6, and also disables the digital key function-OFF button 25B.

Processing Flow

Figure 12:
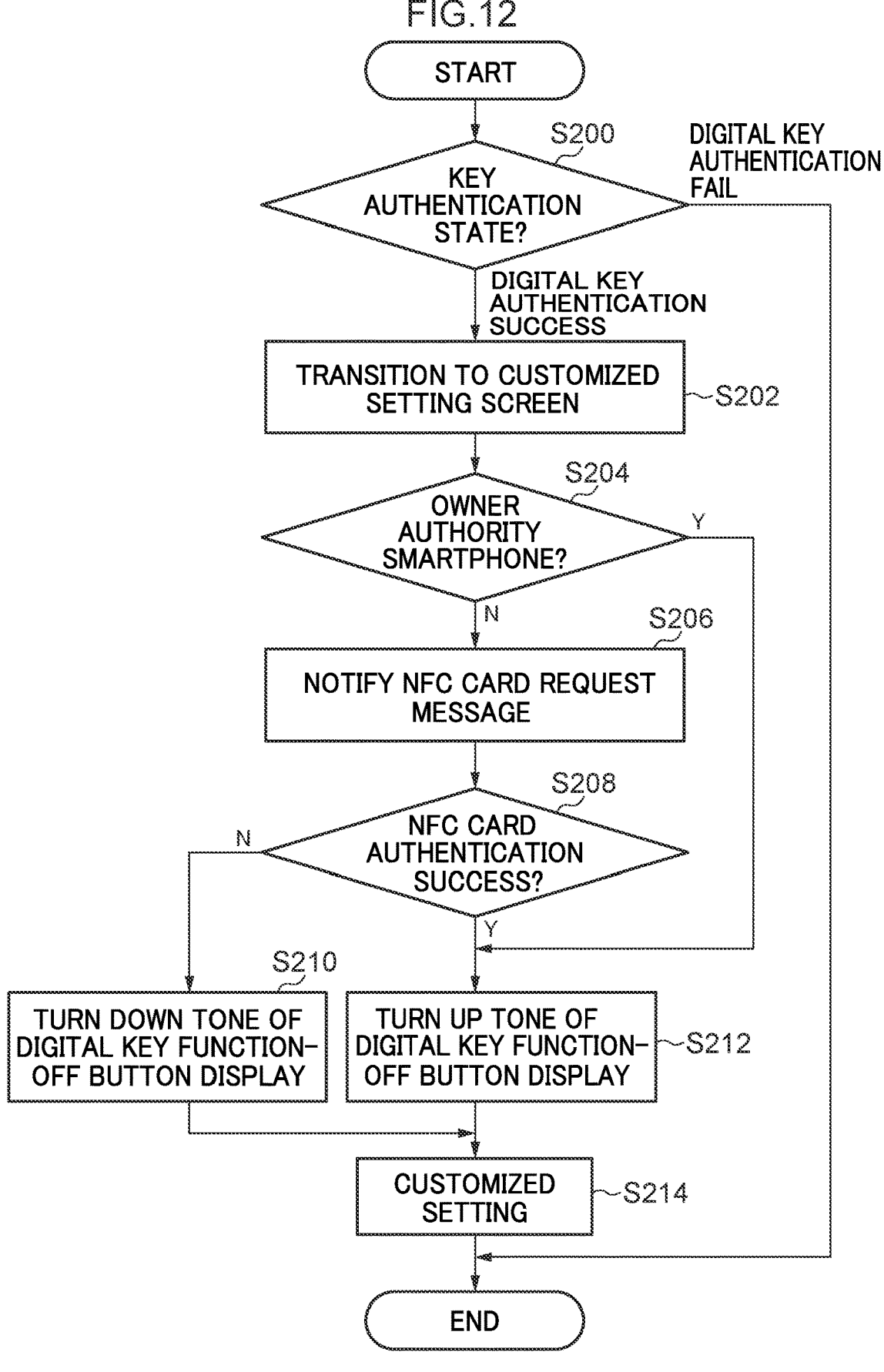
FIG. 12 is a flowchart illustrating an example of a flow of customized setting processing executed in a CPU of a control ECU in an onboard unit of the second exemplary embodiment.
Figure 13:
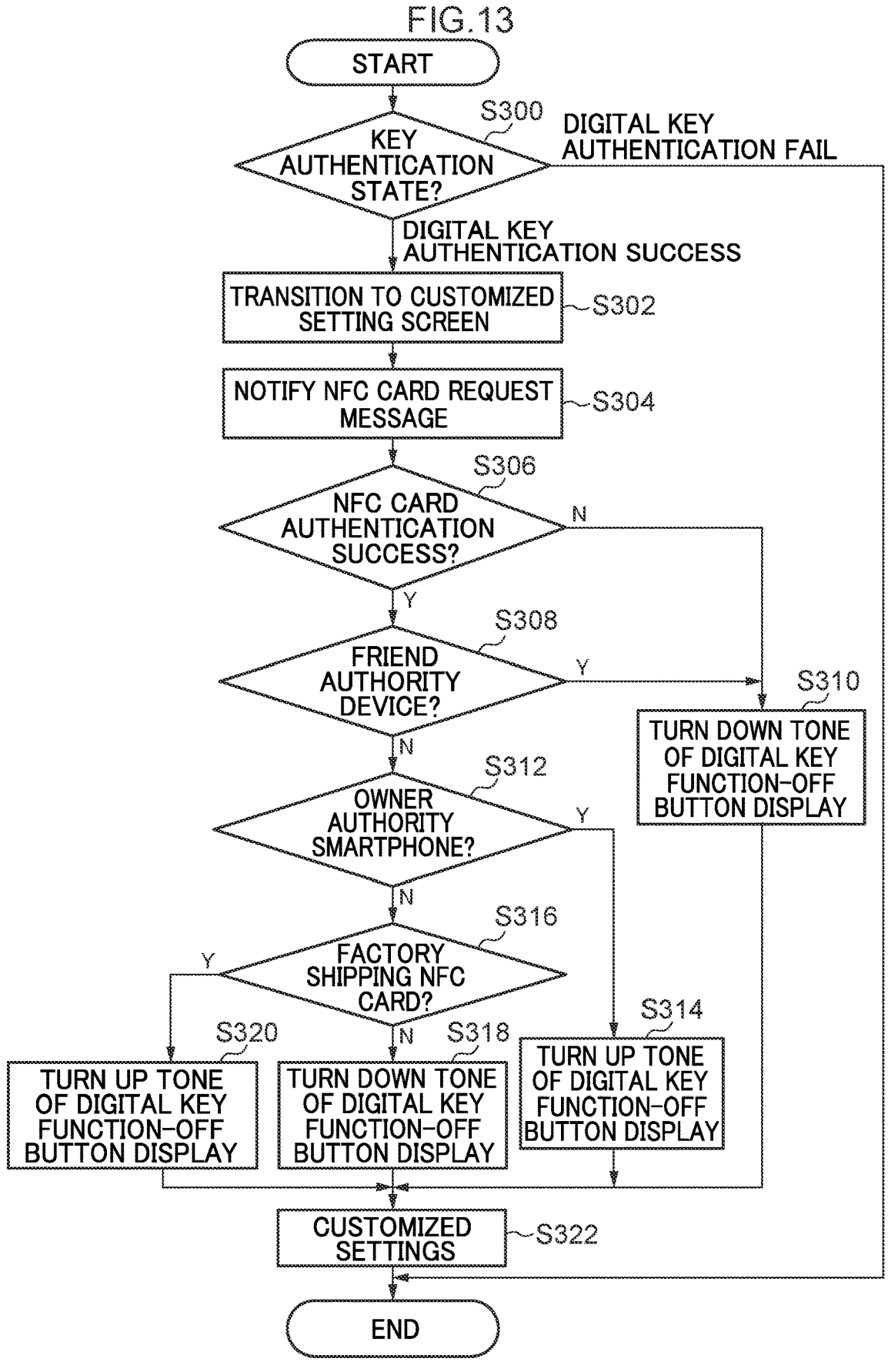
FIG. 13 is a flowchart illustrating an example of a flow of customized setting processing executed in a CPU of a control ECU in an onboard unit of a modified example of the second exemplary embodiment.

Next, explanation follows regarding a flow of processing in the vehicle system 210 of the present exemplary embodiment, with reference to the flowchart of FIG. 12.

First, the smartphone 14 starts the vehicle control application program by operation of a user present in the vicinity of the vehicle 212. Then the smartphone 14 receives a door unlock operation by user operation, the smartphone 14 transmits a signal according to the door unlock operation toward the onboard unit 11, and the onboard unit 211 unlocks the door lock unit 28.

Then when the user has stepped into the vehicle 212 the digital key control ECU 21 of the onboard unit 211 performs authentication of the digital key 140 recorded on the smartphone 14.

When customized setting is instructed on the onboard unit 211 by user operation, the CPU 23A of the control ECU 23 of the onboard unit 211 performs the customized setting processing illustrated in FIG. 12 by executing the information processing program 104.

First at step S200, the CPU 23A functions as the confirmation section 132 and checks the authentication state of the digital key 140. The CPU 23A ends the customized setting processing in cases in which the authentication of the digital key 140 fails. However, the CPU 23A transitions to step S202 in cases in which the authentication of the digital key 140 succeeds.

At step S202, the CPU 23A functions as the reception section 130 and transitions the screen being displayed on the display section 25 to the customized setting screen 25A.

At step S204, the CPU 23A functions as the confirmation section 132 and determines whether or not the smartphone 14 is pre-recorded as a smartphone with owner authority. Reference to a smartphone with owner authority means a smartphone recorded in the vehicle 212 as a smartphone carried by the owner of the vehicle 212. The CPU 23A transitions to step S206 in cases in which the smartphone 14 is not pre-recorded as a smartphone with owner authority. However, the CPU 23A transitions to step S212 in cases in which the smartphone 14 is pre-recorded as a smartphone with owner authority.

At step S206, the CPU 23A functions as the confirmation section 132 and notifies a user with a message requesting the NFC card 250 to be brought close to the NFC communication section 224. The user then brings the carried NFC card 250 close to the NFC communication section 224. Then when the NFC card 250 is close to the NFC communication section 224, the physical key authentication section 110 performs authentication processing on the NFC card 250 by cross-checking the ID of the NFC card 250, based on wireless communication in the NFC communication section 224 with the NFC card 250, against the ID information 100.

At step S208, the CPU 23A functions as the confirmation section 132 and determines whether or not authentication of the NFC card 250 has succeeded using the physical key authentication section 110 of the physical key control ECU 220. The CPU 23A transitions to step S212 in cases in which authentication of the NFC card 250 has succeeded. However, the CPU 23A transitions to step S210 in cases in which the authentication of the NFC card 250 has not succeeded.

At step S210, the CPU 23A functions as the processing section 134 and turns down the tone of display of the digital key function-OFF button 25B on the customized setting screen 25A and also disables the digital key function-OFF button 25B, then transitions to step S214.

At step S212, the CPU 23A functions as the processing section 134 and turns up the tone of display of the digital key function-OFF button 25B on the customized setting screen 25A and also activates the digital key function-OFF button 25B, then transitions to step S214.

At step S214, the CPU 23A functions as the reception section 130 and receives user operation on the customized setting screen 25A, sets so as to disable the digital key function, the smart entry function, or the power back door function, and then ends the customized setting processing. Then in cases in which setting is made so as to disable the digital key function, setting is made according to user selection so as to activate the vehicle control function by the NFC card 250, or the vehicle control function by communication with the NFC communication section (not illustrated in the drawings) in the smartphone 140 with owner authority.

Second Exemplary Embodiment Summary

In the vehicle 212 of the present exemplary embodiment, the control ECU 23 is configured so as to check whether or not the prescribed communication can be performed with the NFC card 250, and to perform processing to suppress disabling of the vehicle control function by the digital key 140 according to user operation in cases in which the prescribed communication with the NFC card 250 has not been confirmed. Thereby the control ECU 23 makes it such that the vehicle control function by the digital key 140 is not able to be disabled in cases in which the prescribed communication with the NFC card 250 has not been confirmed. This enables a reduction in the possibility of losing vehicle control due to mistaken operation in cases in which the user only holds the smartphone 14 recorded with the digital key 140. Note that in cases in which a smartphone employed in digital key authentication is not a smartphone with owner authority, configuration is made such that the vehicle control function using the digital key 140 is not able to be disabled unless authentication by the NFC card 250 succeeds. This is because there is a high possibility that the NFC card 250 is not held in cases in which the smartphone employed is not a smartphone with owner authority. However, in cases in which a smartphone with owner authority is employed there is a high possibility that the NFC card 250 is held, there is a low risk of losing vehicle control, and priority can be given to reducing effort by simplifying authentication.

Modified Example of Second Exemplary Embodiment

In the second exemplary embodiment, explanation has been given of an example of a case in which the NFC card is not requested in cases in which the smartphone 14 stored with the digital key 140 is a smartphone with owner authority, however a configuration may be adopted in which presentation of the NFC card is requested even for a smartphone with owner authority. In a modified example, instead of the customized setting processing illustrated in FIG. 12, the CPU 23A of the control ECU 23 of the onboard unit 211 performs the customized setting processing illustrated in FIG. 13.

First, at step S300, the CPU 23A functions as the confirmation section 132 and checks the authentication state of the digital key 140. The CPU 23A ends the customized setting processing in cases in which the authentication of the digital key 140 fails. However, the CPU 23A transitions to step S302 in cases in which the authentication of the digital key 140 has succeeded.

At step S302, the CPU 23A functions as the reception section 130 and transitions the screen being displayed on the display section 25 to the customized setting screen 25A.

At step S304, the CPU 23A functions as the confirmation section 132 and notifies the user with a message requesting the NFC card 250 to be brought close to the NFC communication section 224. The user then brings the NFC card 250 they are carrying close to the NFC communication section 224. When the NFC card 250 is close to the NFC communication section 224, the physical key authentication section

110 performs authentication processing on the NFC card 250 by cross-checking the ID of the NFC card 250, based on wireless communication in the NFC communication section 224 with the NFC card 250, against the ID information 100.

At step S306, the CPU 23A functions as the confirmation section 132 and determines whether or not authentication of the NFC card 250 has succeeded using the physical key authentication section 110 of the physical key control ECU 220. The CPU 23A transitions to step S308 in cases in which authentication of the NFC card 250 has succeeded. However, the CPU 23A transitions to step S310 in cases in which the authentication of the NFC card 250 had not succeeded.

At step S308, the CPU 23A functions as the confirmation section 132 and determines whether or not the smartphone 14 is pre-recorded as a smartphone with friend authority. The smartphone with friend authority is a smartphone recorded in the vehicle 212 as a smartphone carried by a different person to the owner of the vehicle 212. The CPU 23A transitions to step S312 in cases in which the smartphone 14 is not pre-recorded as a smartphone with friend authority. However, the CPU 23A transitions to step S310 in cases in which the smartphone 14 is pre-recorded as a smartphone with friend authority.

At step S312, the CPU 23A functions as the confirmation section 132 and determines whether or not the smartphone 14 is pre-recorded as a smartphone with owner authority. The CPU 23A transitions to step S316 in cases in which the smartphone 14 is not pre-recorded as a smartphone with owner authority. However, the CPU 23A transitions to step S314 in cases in which the smartphone 14 is pre-recorded as a smartphone with owner authority.

At step S310, the CPU 23A functions as the processing section 134 and turns down the tone of display of the digital key function-OFF button 25B on the customized setting screen 25A and also disables the digital key function-OFF button 25B, then transitions to step S322.

At step S314, the CPU 23A functions as the processing section 134 and turns up the tone of display of the digital key function-OFF button 25B on the customized setting screen 25A and also activates the digital key function-OFF button 25B, then transitions to step S322.

At step S316, the CPU 23A functions as the confirmation section 132 and determines whether or not the authenticated NFC card 250 is an NFC card recorded when shipping from the factory. The CPU 23A transitions to step S320 in cases in which the authenticated NFC card 250 is an NFC card recorded when shipping from the factory. However, the CPU 23A transitions to step S318 in cases in which the authenticated NFC card 250 is not an NFC card recorded when shipping from the factory.

At step S318, the CPU 23A functions as the processing section 134 and turns down the tone of display of the digital key function-OFF button 25B on the customized setting screen 25A and also disables the digital key function-OFF button 25B, then transitions to step S322.

At step S320, the CPU 23A functions as the processing section 134 and turns up the tone of display of the digital key function-OFF button 25B on the customized setting screen 25A and also activates the digital key function-OFF button 25B, then transitions to step S322.

At step S322, the CPU 23A functions as the reception section 130 and receives user operation on the customized setting screen 25A, sets so as to disable the digital key function, the smart entry function, or the power back door function, and then ends the customized setting processing. In cases in which the smartphone 14 is a smartphone with owner authority and also the digital key function is set so as to be disabled, a configuration may be adopted in which the smartphone 14 with owner authority activates the vehicle control function by communication with a NFC communication section (not illustrated in the drawings). Alternatively, the vehicle control function by the digital key recorded on the smartphone 14 different from the smartphone with owner authority may be disabled, and the vehicle control function by digital key recorded on the smartphone with owner authority may be activated.

In the modified example of the second exemplary embodiment, the smartphone 14 requests the NFC card 250 even in cases in which the smartphone 14 is a smartphone with owner authority. This enables the NFC card 250 to be checked even for a smartphone with owner authority, lowering the possibility that vehicle control is lost by miss-operation in cases in which only the smartphone 14 is held. Note that the vehicle control function using the digital key 140 may be set so as to be disabled in cases in which the smartphone 14 is not a smartphone with owner authority and also the NFC card 250 is a card recorded at factory shipping. This is because the NFC card recorded when shipping from the factory may, for example, be an NFC card for use inside a manufacturer prior to shipping, or for use in a business environment such as at a dealer.

A further modified example of the second exemplary embodiment may combine the first exemplary embodiment with the second exemplary embodiment. In such cases, at step S100, both physical key authentication and NFC card authentication may be tried. When this is performed, a physical key authentication fail is defined as cases in which the physical key authentication fails and also the NFC card authentication fails, and a physical key authentication success is defined as cases in which at least one succeeds out of the physical key authentication or the NFC card authentication. Note that the physical key authentication succeeding may be defined as cases in which both the physical key authentication and the NFC card authentication have succeeded, and the physical key authentication fail may be defined as cases in which either the physical key authentication or the NFC card authentication has failed. Which of the above is treated as physical key authentication success may be set by the user.

Moreover, the user may be able to set such that the physical key authentication of the first exemplary embodiment, the NFC card authentication of the second exemplary embodiment, or both authentications of the physical key authentication and the NFC card authentication are performed at step S100.

Third Exemplary Embodiment

Figure 14:
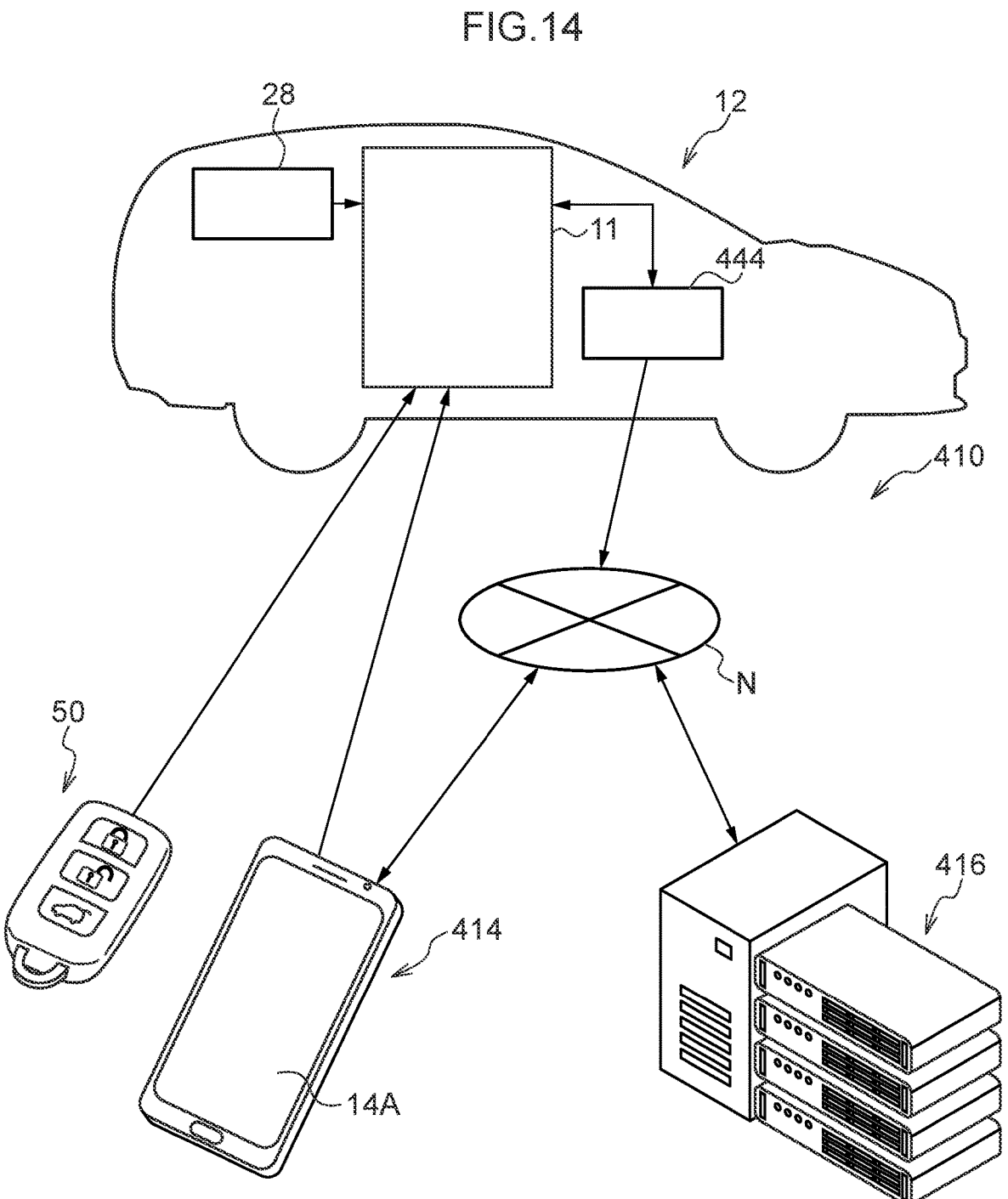
FIG. 14 is a diagram illustrating a schematic configuration of a vehicle system according to a third exemplary embodiment.

In the first and second exemplary embodiments the customized setting is received by an onboard unit. In contrast thereto, a third exemplary embodiment differs from the first and second exemplary embodiments in that the customized setting is received by a smartphone. Explanation follows regarding point of difference to the first exemplary embodiment. The same reference numerals are appended to same configuration, and explanation thereof will be omitted.
Overall Configuration As illustrated in FIG. 14, a vehicle system 410 according to the present exemplary embodiment includes a vehicle 12, a smartphone 414, a physical key 50, and a management server 416.

The vehicle 12, the smartphone 414, and the management server 416 are configured so as to be capable of communication with each other over a network N. The vehicle 12 is equipped with a communication device 444 connected to the network N. Reference here to the network N encompasses both a mobile communication service such as 3G, LTE, etc., and an internet line.
Smartphone As illustrated in FIG. 15, the smartphone 414 is configured including a control device 470, a touch panel 14A, a communication section 14B, and a BLE communication section 14C.

The control device 470 is equipped with hardware including a CPU 472 as an example of a processor, ROM 473, RAM 74, storage 75, and an input/output I/F 76. The CPU 472, the ROM 473, the RAM 74, the storage 75, and the input/output I/F 76 are connected together through a bus 78. The RAM 74 is an example of memory.

The respective functions of the CPU 472, the ROM 473, the RAM 74, the input/output I/F 76 are the same as those of the CPU 20A, the ROM 20B, the RAM 20C, and the input/output I/F 20D.

The CPU 472 reads an information processing program 473A from the ROM 473, and executes the information processing program 473A using the RAM 74 as workspace. In the present exemplary embodiment the information processing program 473A, which as an application program for performing vehicle control by user operation using a digital key 140, is stored in the ROM 473.

Figure 16:
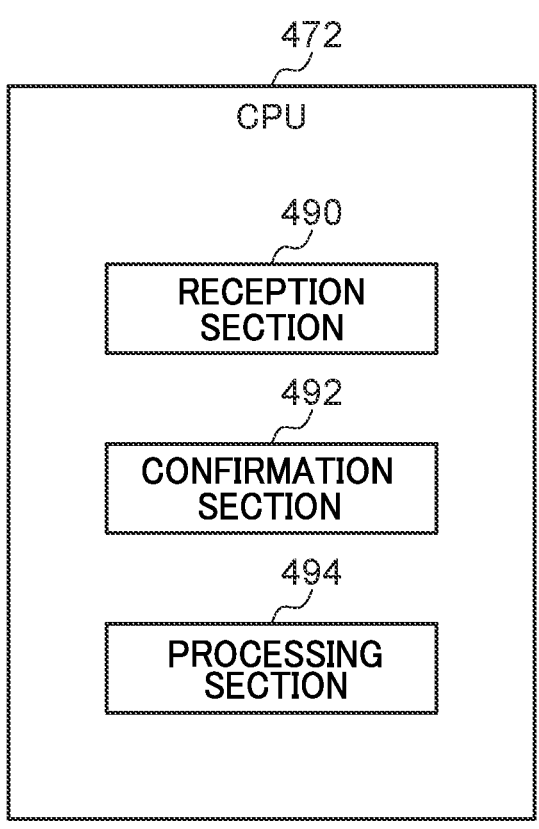
FIG. 16 is a block diagram illustrating an example of a functional configuration of a CPU of a control device in a smartphone of the third exemplary embodiment.

As illustrated in FIG. 16, the CPU 472 functions as a reception section 490, a confirmation section 492, and a processing section 494 by executing the information processing program 473A.

The reception section 490 receives user operation for disabling the vehicle control function by the digital key 140. Specifically, the reception section 490 receives user operation to disable the vehicle control function by the digital key 140 on a user interface displayed on the touch panel 14A.

For example, the customized setting screen 25A illustrated in FIG. 6 is displayed on the touch panel 14A and receives user operation.

The confirmation section 492 checks whether or not a prescribed communication can be performed with the physical key 50. Specifically, the confirmation section 492 determines that the prescribed communication can be performed with the physical key 50 in cases in which information has been received that indicates authentication of the physical key 50 has succeeded by the physical key authentication section 110 of the physical key control ECU 20 of the onboard unit 11.

Figure 17:
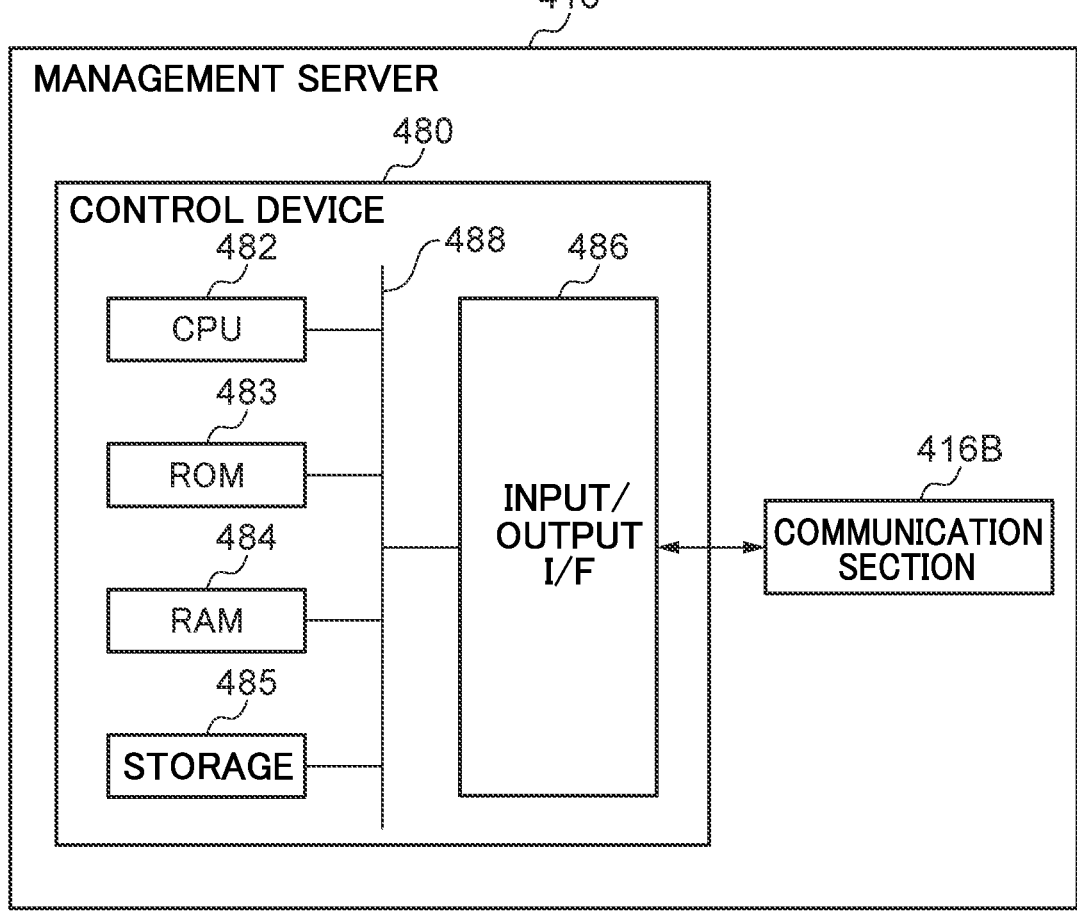
FIG. 17 is a block diagram illustrating a hardware configuration of a management server of the third exemplary embodiment.

The processing section 494 performs processing to suppress disabling of the vehicle control function by the digital key 140 according to user operation in cases in which the prescribed communication with the physical key 50 is not confirmed by the confirmation section 492. Specifically, the processing section 494 controls such that user operation for disabling the vehicle control function by the digital key 140 is not receivable on the user interface being displayed on the touch panel 14A in cases in which the prescribed communication with the physical key 50 is not confirmed by the confirmation section 492. For example, the processing section 494 turns down the tone of display of the digital key function-OFF button 25B on the customized setting screen 25A and also disables the digital key function-OFF button 25B, as illustrated in FIG. 6.
Management Server The management server 416 includes a function to intercede in data exchange between the smartphone 414 and the onboard unit 11. As illustrated in FIG. 17, the management server 416 is configured including a control device 480 and a communication section 416B.

The control device 480 is equipped with a CPU 482, ROM 483, RAM 484, storage 485, and an input/output I/F 486. The CPU 482, the ROM 483, the RAM 484, the storage 485, and the input/output I/F 486 are connected together through a bus 488.

The respective functions of the CPU 482, the ROM 483, the RAM 484, the storage 485, and the input/output I/F 486 are the same as those of the CPU 72, the ROM 73, the RAM 74, the storage 75 and the input/output I/F 76 described above.

The CPU 482 reads a program from the storage 485, and executes the program using the RAM 484 as workspace. In the present exemplary embodiment a program for interceding in data exchange between the smartphone 414 and the onboard unit 11 is stored in the storage 485.

A communication section 416B is connected to the control device 480 of the present exemplary embodiment through the input/output I/F 486. Note that the communication section 416B may be directly connected to the bus 488.

Processing Flow

Figure 18:
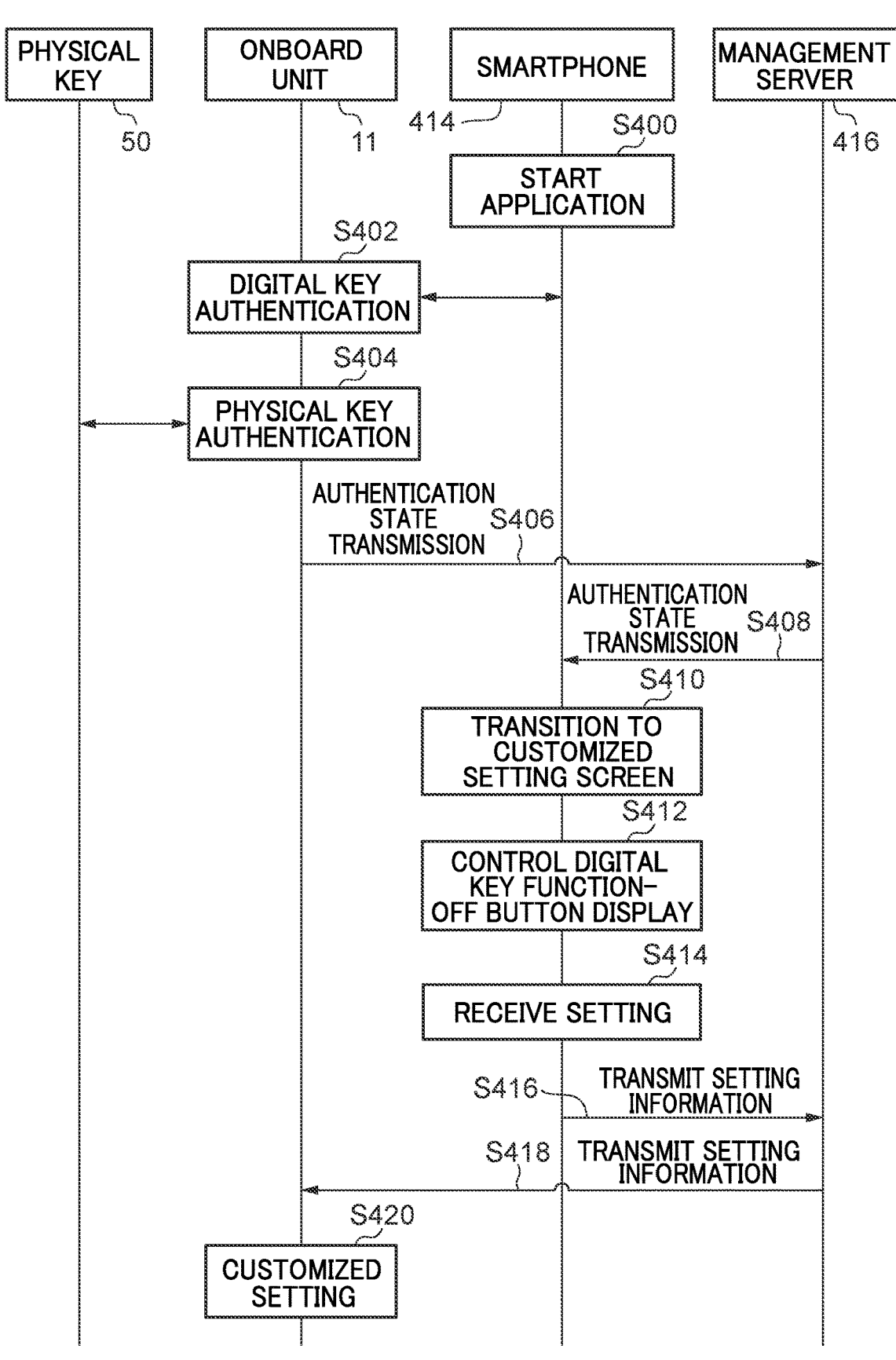
FIG. 18 is a sequence chart illustrating a flow of processing in a vehicle system of the third exemplary embodiment.
Figure 19:
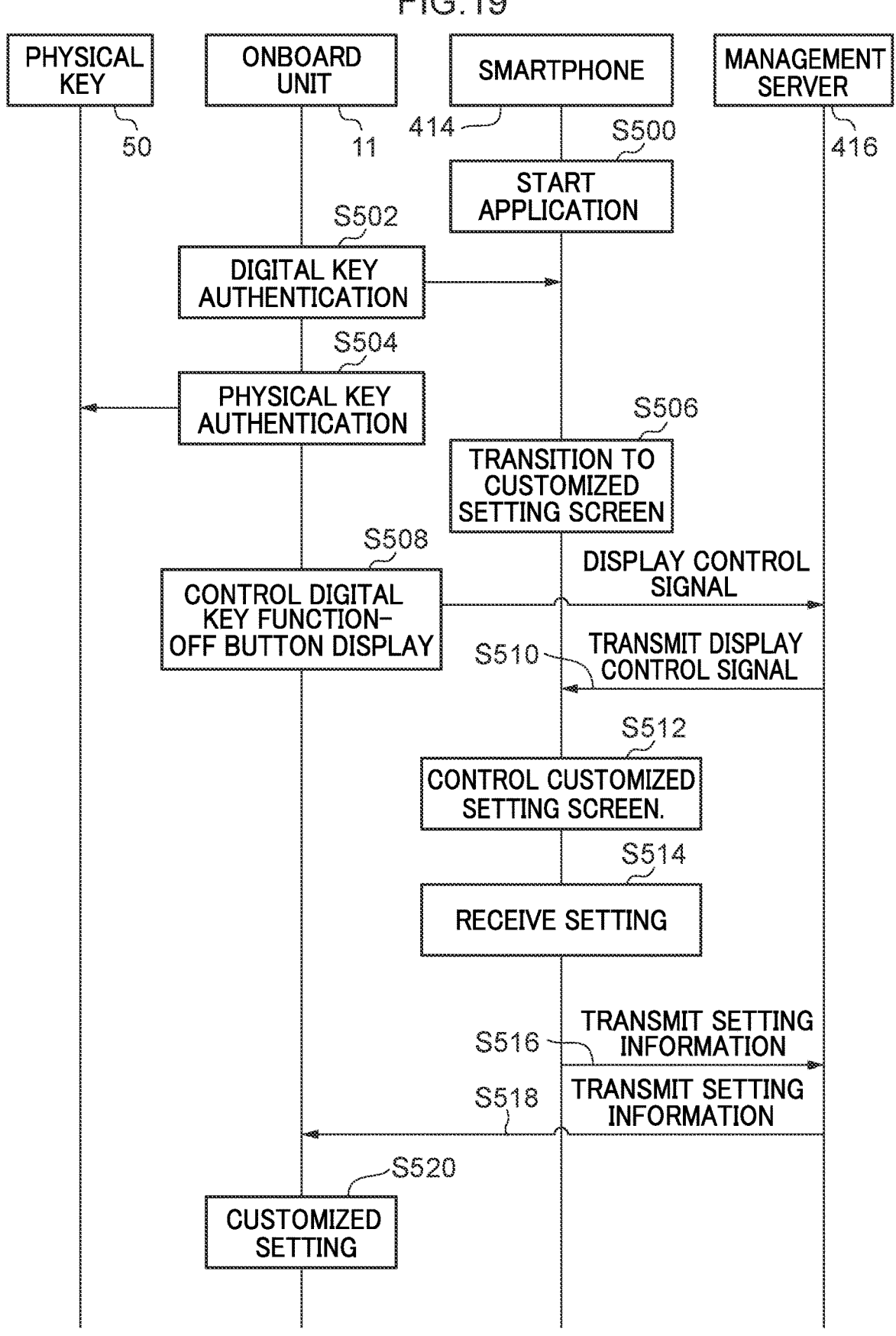
FIG. 19 is a sequence chart illustrating a flow of processing in a vehicle system of a modified example of the third exemplary embodiment.

Next, explanation follows regarding a flow of processing in the vehicle system 410 of the present exemplary embodiment, with reference to a sequence chart of FIG. 18.

First at step S400, the smartphone 414 starts up the information processing program 473A by operation of a user present in the vicinity of the vehicle 12. Then the smartphone 414 or the physical key 50 receives a door unlock operation by user operation, the smartphone 414 or the physical key 50 transmits a signal according to the door unlock operation toward the onboard unit 11, and the onboard unit 11 unlocks the door lock unit 28.

Then when the user steps into the vehicle 12, at step S402 the digital key control ECU 21 performs authentication of the digital key 140 recorded on the smartphone 414. At step S404 the physical key control ECU 20 of the onboard unit 11 performs authentication of the physical key 50.

At step S406 the CPU 23A of the control ECU 23 of the onboard unit 11 transmits information indicating the authentication state of the digital key 140 and the authentication state of the physical key 50 to the management server 416 using the communication device 444.

At step S408, the management server 416 transmits the received information indicating the authentication state of the digital key 140 and the authentication state of the physical key 50 to the smartphone 414 using the communication section 416B.

Then when customized setting on the smartphone 414 is instructed by user operation, at step S410 the CPU 472 of the control device 470 of the smartphone 414 transitions the screen being displayed on the touch panel 14A to the customized setting screen 25A.

At step S412, the CPU 472 of the control device 470 of the smartphone 414 functions as the confirmation section 492 and checks the authentication state of the digital key 140 and the authentication state of the physical key 50. The CPU 472 then functions as the processing section 494 and, in cases in which the prescribed communication with the physical key 50 has not been confirmed by the confirmation section 492, turns down the tone of display of the digital key function-OFF button 25B on the customized setting screen 25A and also disables the digital key function-OFF button 25B.

At step S414, the CPU 472 of the control device 470 of the smartphone 414 functions as the reception section 490 and receives user operation on the customized setting screen 25A.

At step S416 the CPU 472 of the control device 470 of the smartphone 414 functions as the reception section 490, and transmits setting information for setting so as to disable the digital key function, the smart entry function, or the power back door function to the management server 416 using the communication section 14B.

At step S418 the management server 416 transmits the received setting information to the onboard unit 11 using the communication section 416B.

At step S420 the CPU 23A of the control ECU 23 of the onboard unit 11 sets so as to disable the digital key function, the smart entry function, or the power back door function according to the setting information received.

Third Exemplary Embodiment Summary

In the smartphone 414 of the present exemplary embodiment the control device 470 is configured so as to check whether or not the prescribed communication can be made between the physical key 50 and the vehicle 12, and to perform processing to suppress disabling of the vehicle control function by the digital key 140 according to user operation in cases in which the prescribed communication between the physical key 50 and the vehicle 12 has not been confirmed. In this manner, the control device 470 makes it such that the vehicle control function using the digital key 140 is not able to be disabled in cases in which the prescribed communication between the physical key 50 and the vehicle 12 has not been confirmed. Doing so enables a reduction in the possibility that vehicle control is lost by miss-operation in cases in which the user only holds the smartphone 414 recorded with the digital key 140.

Third Exemplary Embodiment Modified Example

In the third exemplary embodiment explanation has been given of an example of a case in which it is information indicating the authentication state of the digital key 140 and the authentication state of the physical key 50 that is transmitted from the onboard unit 11 to the management server 416, however there is no limitation thereto. Control information for controlling the customized setting screen 25A of the smartphone 414 according to information indicating the authentication state of the digital key 140 and the authentication state of the physical key 50 may be transmitted from the onboard unit 11. The modified example has the flow of processing illustrated in FIG. 19 instead of the flow of processing illustrated in FIG. 18. Moreover, the CPU 23A of the control ECU 23 of the onboard unit 11 functions as the reception section 130, the confirmation section 132, and the processing section 134 by executing the information processing program 104.

First, at step S500, the smartphone 414 starts up the vehicle control application program by operation by a user present in the vicinity of the vehicle 12. Then the smartphone 414 or the physical key 50 receives a door unlock operation by user operation, and the smartphone 414 or the physical key 50 transmits a signal according to the door unlock operation toward the onboard unit 11, and the onboard unit 11 unlocks the door lock unit 28.

Then when the user steps into the vehicle 12, at step S502 the digital key control ECU 21 performs authentication of the digital key 140 recorded on the smartphone 414. At step S504 the physical key control ECU 20 of the onboard unit 11 performs authentication of the physical key 50.

Then when customized setting on the smartphone 414 is instructed by user operation, at step S506 the CPU 472 of the control device 470 of the smartphone 414 transitions the screen being displayed on the touch panel 14A to the customized setting screen 25A.

Then at step S508, the CPU 23A of the control ECU 23 of the onboard unit 11 functions as the confirmation section 132 and checks the authentication state of the digital key 140 and the authentication state of the physical key 50. The CPU 23A then functions as the processing section 134 and transmits a display control signal to the management server 416 using the communication device 444 in cases in which the prescribed communication with the physical key 50 has not been confirmed by the confirmation section 132. This display control signal is a signal to control so as to turn down the tone of display of the digital key function-OFF button 25B on the customized setting screen 25A of the touch panel 14A of the smartphone 414 and so as to also disable the digital key function-OFF button 25B.

At step S510, the management server 416 transmits the received display control signal to the smartphone 414 using the communication section 416B.

At step S512, the CPU 472 of the control device 470 of the smartphone 414 controls the display of the customized setting screen 25A of the touch panel 14A based on the display control signal received.

At step S514, the CPU 472 of the control device 470 of the smartphone 414 receives user operation on the customized setting screen 25A.

At step S516, the CPU 472 of the control device 470 of the smartphone 414 transmits setting information for setting such that the digital key function, the smart entry function, or the power back door function is disabled to the management server 416 using the communication section 14B.

At step S518 the management server 416 transmits the received setting information to the onboard unit 11 using communication section 416B.

At step S520 the CPU 23A of the control ECU 23 of the onboard unit 11 sets so as to disable the digital key function, the smart entry function, or the power back door function according to the setting information received.

Thus in the vehicle 12 of the modified example of the present exemplary embodiment, the control ECU 23 is configured so as to check the prescribed communication with the physical key 50, and to perform processing to suppress disabling of the vehicle control function by the digital key 140 according to user operation in cases in which the prescribed communication with the physical key 50 is not confirmed. In this manner the control ECU 23 makes it such that the vehicle control function using the digital key 140 is not able to be disabled in cases in which the prescribed communication with the physical key 50 is not confirmed. This thereby enables a reduction in the possibility that vehicle control is lost by miss-operation in cases in which the user only holds the smartphone 414 recorded with the digital key 140.

Remarks

Although in each of the exemplary embodiments above the terminal recorded with the digital key 140 is the smartphone 14, 414, there is no limitation thereto and the digital key 140 may be recorded in any device having a communication function, such as a tablet computer, a wearable computer, or the like.

Moreover, although explanation has been given of an example of cases in which, in the vehicle 12 or the smartphone 414 of the exemplary embodiments, the digital key function-OFF button 25B of the customized setting screen 25A is displayed turned down in tone and the digital key function-OFF button 25B is disabled, there is no limitation thereto. For example, configuration may be made so as to notify a message indicating that user operation for disabling the vehicle control function of the digital key 140 is non-receivable. As an example, an error message of "Vehicle control function of digital key is not able to be disabled due to absence of the physical key" may be notified. Moreover in such cases, after user operation has been received to disable the vehicle control function of the digital key 140, the control ECU 23 may be configured so as to confirm the prescribed communication with the physical key 50.

Moreover, although in each of the exemplary embodiments examples have been given of cases in which user operation for disabling the vehicle control function by the digital key 140 is received on the customized setting screen 25A being displayed on the display section 25 of the onboard unit 11 or on the touch panel 14A of the smartphone 414, there is no limitation thereto. A configuration may be adopted such that user operation for disabling the vehicle control function of the digital key 140 is received by press-operation of a button provided inside the vehicle.

Moreover, although explanation has been given of examples in each of the exemplary embodiments of cases in which the physical key 50 performs wireless communication with the onboard unit 11 using an LF band or an RF band, there is no limitation thereto. For example, the physical key 50 may be configured so as to perform wireless communication with the onboard unit 11 using Bluetooth (registered trademark), NFC, or ultrawide band (UWB) communication.

Moreover, although in each of the exemplary embodiments examples have been explained of cases in which the smartphone 14, 414 performs wireless communication with the onboard unit 11 using Bluetooth (registered trademark), there is no limitation thereto. For example, the smartphone 14, 414 may perform wireless communication with the onboard unit 11 using NFC or UWB.

Note that the various processing executed by the CPU 23A, 472 reading software (programs) in the present exemplary embodiment may be executed by various processors other than CPUs. Such processors include programmable logic devices (PLD) that allow circuit configuration to be modified post-manufacture, such as a field-programmable gate array (FPGA), and dedicated electronic circuits, these being processors including a circuit configuration custom-designed to execute specific processing, such as an application specific integrated circuit (ASIC). Each of the processing instances may be executed by any one of these various types of processors, or may be executed by a combination of two or more of the same type or different types of processors (such as plural FPGAs, or a combination of a CPU and an FPGA). The hardware structure of these various types of processors is more specifically an electronic circuit combining circuit elements such as semiconductor elements.

Moreover, in the exemplary embodiments described above examples are explained in which each of the programs is pre-stored (installed) on a computer readable non-transitory recording medium. For example, the information processing program 104 in the onboard unit 11 is pre-stored in the ROM 23B. Moreover, for example, the information processing program 473A in the smartphone 414 is pre-stored in the ROM 473. However, there is no limitation thereto, and each of the programs may be provided in a format recorded on a non-transitory recording medium such as a compact disc read only memory (CD-ROM), a digital versatile disc read only memory (DVD-ROM), or a universal serial bus (USB) memory. Moreover, each of the programs may be provided in a format downloadable from an external device over a network.

The flows of processing as explained for the exemplary embodiments above are merely examples thereof, and unwanted steps may be removed, new steps may be added, and the processing sequence may be changed within a range not departing from the spirit of the present disclosure.

In addition the respective configurations of the onboard units, the smartphone, the physical key, and the management server as explained in the exemplary embodiments above are merely examples thereof, and may be modified according to circumstances within a range not departing from the spirit of the present disclosure.

What is claimed is:

1. An information processing device comprising:
a memory; and
a processor coupled to the memory, wherein the processor is configured to:
receive user operation of a user-interface, which is displayed on a display, for disabling a vehicle control function of a first key configured to be used to control a vehicle;
confirm whether or not a prescribed authentication processing has succeeded with a second key that is a key configured to be used to control the vehicle and that is different from the first key when the user instructs the display to display a screen for customization settings for vehicle control functions;
when the prescribed authentication processing with the second key has not succeeded, display a screen on the display that indicates that disabling of the vehicle control function of the first key is suppressed; and
when the prescribed authentication processing with the second key has succeeded, display a screen on the display that indicates acceptance of the disabling of the vehicle control function of the first key.

2. The information processing device of claim 1, wherein the processor is configured to receive a press-operation of a button that is provided inside the vehicle and is a button for disabling the vehicle control function by the first key.

3. The information processing device of claim 1, wherein the processor is configured to control so as to make the user operation on the user-interface non-receivable in a case in which the prescribed authentication processing with the second key has not been confirmed.

4. The information processing device of claim 1, wherein the processor notifies a message expressing that the user operation is non-receivable in a case in which the prescribed authentication processing with the second key has not been confirmed.

5. The information processing device of claim 1, wherein the processor confirms whether or not the prescribed authentication processing can be performed with the second key, by checking identification information of the second key which is capable of the prescribed authentication processing inside the vehicle against identification information of the second key which is pre-recorded.

6. The information processing device of claim 1, wherein the processor confirms whether or not the prescribed authentication processing can be performed with the second key by checking identification information of the second key, which a user has brought within range of a near field communication section provided inside the vehicle, against identification information of the second key which is pre-recorded.

7. The information processing device of claim 1, wherein the processor confirms the prescribed authentication processing can be performed with the second key by transmitting a response request signal for the second key, which is pre-recorded, and determining whether or not a response signal has been received from the second key.

8. The information processing device of claim 1, wherein the processor checks whether or not the prescribed authentication processing can be performed with the second key by determining whether or not a signal emitted from the second key, which is pre-recorded, has been received.

9. A vehicle comprising:
the information processing device of claim 1; and
a lock configured to perform locking and unlocking of an opening and closing section that partitions an interior of the vehicle from an exterior of the vehicle.

10. An information processing method comprising:
receiving user operation of a user-interface, which is displayed on a display, for disabling a vehicle control function of a first key configured to be used to control a vehicle;
confirm whether or not a prescribed authentication processing communication can be performed has succeeded with a second key that is a key configured to be used to control the vehicle and that is different from the first key when the user instructs the display to display a screen for customization settings for vehicle control functions; and
when the prescribed authentication processing with the second key has not succeeded, display a screen on the display that indicates that disabling of the vehicle control function of the first key is suppressed; and
when the prescribed authentication processing with the second key has succeeded, display a screen on the display that indicates acceptance of the disabling of the vehicle control function of the first key.

11. A non-transitory recording medium storing a program that causes a computer to execute processing, the processing comprising:
receiving user operation of a user-interface, which is displayed on a display, for disabling a vehicle control function by a first key configured to be used to control a vehicle;
confirming whether or not a prescribed authentication processing communication can be performed has succeeded with a second key that is a key configured to be used to control the vehicle and that is different from the first key when the user instructs the display to display a screen for customization settings for vehicle control functions; and
when the prescribed authentication processing with the second key has not succeeded, display a screen on the display that indicates that disabling of the vehicle control function of the first key is suppressed; and
when the prescribed authentication processing with the second key has succeeded, display a screen on the display that indicates acceptance of the disabling of the vehicle control function of the first key.

* * * * *